(12) United States Patent
Lutz

(10) Patent No.: US 6,248,804 B1
(45) Date of Patent: *Jun. 19, 2001

(54) ULTRAVIOLET AND OR/ VISIBLE LIGHT CURABLE INKS WITH PHOTOINITIATORS FOR GAME BALLS, GOLF BALLS AND THE LIKE

(75) Inventor: Mitchell E. Lutz, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/009,720

(22) Filed: Jan. 20, 1998

Related U.S. Application Data

(63) Continuation-in-part of application No. 08/807,502, filed on Feb. 27, 1997, now Pat. No. 6,013,330.

(51) Int. Cl.$^7$ ................. C09D 11/10; C08F 2/48

(52) U.S. Cl. .................. 523/160; 522/14; 522/15; 522/16; 522/25; 522/26; 522/28; 522/29; 522/63; 522/909

(58) Field of Search ............... 523/160, 161; 522/25, 26, 28, 29, 50, 63, 66, 68, 70, 14, 15, 16, 23, 909, 913; 524/908; 101/DIG. 40; 473/378

(56) References Cited

U.S. PATENT DOCUMENTS

| | | | |
|---|---|---|---|
| H304 | 7/1987 | Vorrier et al. | 522/92 |
| 3,781,214 | 12/1973 | Nemoto et al. | 260/22 |
| 3,803,109 | 4/1974 | Nemoto et al. | 260/89.1 |
| 4,164,423 | 8/1979 | Schumacher | 106/20 |
| 4,228,438 * | 10/1980 | Vazirani et al. | 347/102 |
| 4,264,483 | 4/1981 | Laufer et al. | 260/23 |
| 4,271,258 | 6/1981 | Watariguchi | 430/284 |
| 4,486,033 | 12/1984 | Parrotta | 283/94 |
| 4,670,295 | 6/1987 | Quinn et al. | 427/54.1 |
| 4,680,368 | 7/1987 | Nakamoto et al. | 528/49 |
| 4,751,102 * | 6/1988 | Adair et al. | 475/102 |
| 4,776,270 | 10/1988 | Kumamoto | 101/35 |
| 4,856,670 | 8/1989 | Hang et al. | 220/2.1 |
| 4,875,410 | 10/1989 | Lee et al. | 101/170 |
| 4,978,969 | 12/1990 | Chieng | 346/1.1 |
| 5,093,038 | 3/1992 | Durand | 252/514 |
| 5,160,836 | 11/1992 | Harris et al. | 106/19 R |
| 5,166,186 | 11/1992 | Kojime et al. | 522/37 |
| 5,275,646 | 1/1994 | Marshall et al. | 106/20 B |
| 5,336,530 * | 8/1994 | Ikemoto et al. | 427/503 |
| 5,391,685 | 2/1995 | Hitomi et al. | 528/75 |
| 5,395,862 | 3/1995 | Neckers et al. . | |
| 5,451,343 | 9/1995 | Neckers et al. . | |
| 5,545,676 * | 8/1996 | Palazzatto et al. | 522/15 |
| 5,571,359 * | 11/1996 | Kamen et al. | 156/233 |
| 5,641,346 * | 6/1997 | Mantell et al. | 106/31.58 |
| 5,717,004 * | 2/1998 | Hashimoto et al. | 522/84 |
| 5,721,288 * | 2/1998 | Aotoni et al. | 522/12 |
| 5,739,077 * | 4/1998 | Goto et al. | 503/200 |
| 5,770,325 * | 6/1998 | Keller et al. | 428/914 |
| 6,099,415 * | 8/2000 | Lutz | 473/357 |

FOREIGN PATENT DOCUMENTS

| | | |
|---|---|---|
| 2173068 | 3/1997 | (CA) . |
| 0 106 628 B1 | 1/1987 | (EP) . |
| 2022116 | 12/1979 | (GB) . |
| 2211791 | 7/1989 | (GB) . |
| 2256874 | 12/1992 | (GB) . |
| 2305183 | 2/1997 | (GB) . |
| 59-174667 | 10/1984 | (JP) . |
| 60-025756 | 2/1985 | (JP) . |
| 60-141584 | 7/1985 | (JP) . |
| 6145580 | 5/1994 | (JP) . |
| WO 94/13749 | 6/1994 | (WO) . |

OTHER PUBLICATIONS

Atkins, P.W.; Physical Chemistry 3rd Ed., W.H. Freeman and Co., New York (p. 432), 1986.*
Leach, R.H. and Peirce, R.J.; The Printing Ink Manual, Blueprint, London (p. 653), 1993.*
Carl Verbanic, "Radiation Curing Consolidates Its Gains", Chemical Business, Mar. 1993, pp. 13–18.
Padprint, a Trans Tech America Inc. Publication, vol. VI, Issue 1, Spring–Summer 1994, p. 7.
Trans Tech America Inc. flyer entitled "Transfer Pad Printing Ink Type UVA (Ultraviolet Curable)", Rev. 12/94.
Trans Tech America Inc. flyer entitled "Transfer Pad Printing Ink Type UVB (Ultraviolet Curable)", Rev. 6/94.
Trans Tech America Inc. Material Safety Data Sheet; Product Name: UV Curable Pad Printing Ink; Sep. 28, 1994.
Trans Tech America Inc. Material Safety Data Sheet; Product Name: UV Curable Pad Printing Ink; Nov. 3, 1993.
UVEXS Ultraviolet Exposure Systems Material Safety Data Sheet; Product Name: 304–43 Series—UV Curable Pad Printing Inks; Apr. 19, 1994.

(List continued on next page.)

*Primary Examiner*—Vasu Jagannathan
*Assistant Examiner*—Callie E. Shosho

(57) ABSTRACT

Radiation curing of inks on game balls, golf balls and the like is disclosed. The radiation used is ultraviolet and/or visible light. Production inks, logo inks and methods for forming production prints and logos on golf balls, game balls and the like are disclosed. To ensure that the ink is sufficiently through-cured, visible light photoinitiators are added to the ink. In addition, co-initiators and ultraviolet light photoinitiators can also be included in the ink. To form a radiation curable water-insoluble production ink, at least an adhesion promoting component is added to an ink base. The adhesion promoting component is sufficient to maintain adhesion of the production ink of at least about 75% of the inked surface to the topcoat and to the surface of the game ball or the golf ball after radiation curing and after coating the production ink with the topcoat. To form radiation curable water-insoluble logo ink, at least a toughening agent is added to an ink base. The toughening agent is sufficient to maintain adhesion of the logo ink to the topcoat of at least about 75% of the inked surface after radiation curing.

50 Claims, 6 Drawing Sheets

OTHER PUBLICATIONS

Automated Industrial Systems, Inc., 21H Series UV Ink Data Bulletin (Date unavailable).

Automated Industrial Systems, Inc., 21A–400 UV Curable Inks, Material Safety Data Sheet (Date unavailable).

Automated Industrial Systems, Inc., 21A–400 Ink, Product Bulletin (Date unavailable).

perma–Mark, 21A Series U.V. Ink, Ink & Chemical Data Sheet (Date unavailable).

Automated Industrial Systems, Inc., 21H Series UV Ink, Material Safety Data Sheet (Date unavailable).

First Chemical Corporation FirstCure™ ITX, Photoinitiator (Date unavailable).

DeRaaff, et al. "Optimized Cur Efficiency Using a Fluorone Visible Light Photoinitator and a Novel Charge Transfer Complex Initiating System", Spectra Group Limited, Maumee, Ohio, U.S.A. (May 1996).

H–Nu 470 "Visible and UV/Visible Light Photoinitiator", Spectra Group Limited, Inc.(Date unavailable).

SGL's H–Nu 470 Helpful Tips Sheet, Spectra Group Limited, Inc. (Jan. 1997).

Spectra Group Ltd. Photosciences Expertise (Date unavailable).

Dr. Honle, UV Intensity Distribution & Lamp Disposal (Date unavailable).

Richard W. Stowe, "New Developments in UV Curing" The Coatings Agenda America 1997/98.

Irgacure® 369 "Photoinitator for Ultraviolet Curing of Inks, Pigmented Coatings and Thick Section Curing", Ciba–Geigy (Date unavailable).

Irgacure® 907 "Photoinitator for Ultraviolet Curing of Coatings and Inks", Ciba–Geigy (Date unavailable).

Moore et al., "Enhanced Cure of Highly Pigmented White Coatings Using a Fluorone Visible Light Photoinitiator", Radtech Report, Mar./Apr. 1997.

"Demand for more colorful, highly pigmented UV coatings is driving development of new photoinitiator chemistries", Industrial Paint & Powder, 7/97.

"Photoinitiator Systems With Selected UV Spectral Output", Radiation Curable Coatings, vol. 184 No. 4361, Nov. 23, 1994.

Protective Coatings, Chapter 21: Aesthetics: Gloss, Opacity, and Color, pp. 309–11 (Date unavailable).

SGL CM 1000 Cure Monitor (Date unavailable).

K. Dietliker, Chemistry & Technology of UV & EB Formulation for Coatings, Inks & Paints, vol. III, Photoinitiators for Free Radical and Cationic Polymerization (1991).

* cited by examiner

ULTRAVIOLET AND OR/ VISIBLE LIGHT CURABLE INKS WITH PHOTOINITIATORS FOR GAME BALLS, GOLF BALLS AND THE LIKE

CROSS-REFERENCE TO RELATED APPLICATIONS

This is a continuation-in-part of application Ser. No. 08/807,502 filed Feb. 27, 1997, now U.S. Pat. No. 6,013,330.

FIELD OF THE INVENTION

The present invention is directed to radiation curable, particularly ultraviolet (UV) and/or visible light curable inks, which are applied to curved surfaces including spherical surfaces. More particularly, the invention is directed to radiation curable inks containing photoinitiators, particularly visible light photoinitiators and their application to and curing upon game balls, golf balls and the like. These inks are preferentially applied as single or multiple, clear or colored layers for forming logos or production prints on game balls including golf balls.

BACKGROUND OF THE INVENTION

It is often desirable to apply clear, pigmented or dyed ink coatings or layers to form distinctive logos or production prints on game balls (e.g., golf balls, ping pong balls, billiard balls, baseballs, basketballs, racquet balls, handballs, etc.). Various commercially available inks are commonly used for this purpose.

To clarify the difference between logo printing and production printing, a brief description of these processes as they are applied to game balls such as golf balls (e.g., having curved surfaces) is provided below. Golf balls are commonly one-piece, two-piece or three-piece constructions. One-piece balls are made from a homogeneous polymer shaped into a golf ball. Two-piece golf balls comprise an inner core and an outer surrounding polymeric shell. Three-piece golf balls comprise various combinations of a core (wound or unwound), one or more intermediate polymeric shells and an outer polymeric cover. The cover polymer used in two-piece and three-piece balls may, for example, be balata, an ionomeric polymer (e.g., SURLYN®) or a polyurethane.

Golf ball covers are commonly painted with a primer coat which may be colored (e.g., white) or transparent. Alternately, the cover itself may contain a colorant. Typically, a tough, often glossy, topcoat is applied over the cover and/or the primer coat to form a protective outer seal on the golf ball. The topcoat may comprise, for example, a two component urethane. The topcoat typically increases the shine (i.e., glossy appearance) and durability of the golf ball to enhance or brighten its appearance.

As used herein, "production printing" refers to a process wherein ink is applied directly to the cover or to the primer coat and the ink is then further coated with a topcoat. The image produced thereby is a "production" print and the ink used for this purpose is a "production" ink. In production printing, for some applications, when ink is applied directly to a cover, the cover surface is first prepared for bonding, for example, by sandblasting, plasma treatment or corona bonding, to enhance the bond between the ink and the cover. Thereafter, the ink is applied to the roughened cover. A transparent water based or solvent based overcoat may be applied over the ink layer and on the roughened cover to smooth out the cover and ink surfaces. Examples of such overcoats include urethane, polyester and acrylic. Thereafter, a topcoat is preferably applied to the overcoat.

Alternatively, "logo printing" as also used herein, involves the application of the ink directly onto a topcoat. The image produced thereby is a "logo" and the ink is a logo (or custom) ink. Thus, by use of production and/or logo printing one may add decorative markings such as a company trademark, symbol or the like to increase brand recognition and/or to enhance the appearance and/or the visibility of golf balls, game balls and the like. As used herein, the term "ball" is used to refer to game balls, golf balls and the like.

Most commonly, logos and production prints are applied to golf balls by a pad printing process and apparatus. Pad printing uses an etched image plate (i.e., a cliche) having a negative etching of the desired image. The image plate, typically, is made of a tough material such as metal, steel, other alloy or photopolymer which normally has a uniform thickness except for the area defining the negative etched image. The plate may optionally be coated with one or more protectant layers or materials, to enhance its useful life. Typically, the depth of the etched image is from about 5 microns to about 30 microns or any value therebetween.

During pad printing, ink is applied to the image plate, thus filling the etched image. Excess ink is then scraped off of the image plate, leaving behind ink only within the etched image. A printing pad is then momentarily lowered and pressed onto the inked image plate to lift ink off of the etched ink filled cavity onto the printing pad. The ink so lifted defines the shape of the etched image. The inked pad is then momentarily lowered and pressed onto, for example, a golf ball, thereby releasing the ink from the pad to the golf ball. The ink released from the pad forms, on the spherical surface of the ball, an image corresponding to that of the etched cavity.

This process of inking the image plate, scraping off excess ink, lifting off ink onto the printing pad and releasing the ink from the pad to the object (e.g., golf ball) to be inked may be repeated to print a plurality of images on a plurality of types of balls with various inks having desirable ink properties. The process of pad printing is well known. See, for example, U.S. Pat. No. 5,513,567 (Froh et al.); U.S. Pat. No. 4,896,598 (Leech, Jr.); U.S. Pat. No. 4,803,922 (Denesen); U.S. Pat. No. 4,745,857 (Putnam et al.); and U.S. Pat. No. 5,237,922 (Ho).

Printing pads are made from a resilient material such as silicone rubber which desirably picks up ink from the etched cavity of the image plate during lift-off and releases all of the ink lifted off when brought into contact with the article to be printed. Once the ink is deposited, it is cured, most commonly by a thermal curing process.

However, during manufacturing of printed articles such as game balls and golf balls, ink transfer problems are often encountered. For example, while it is desirable that all of the ink picked up by the printing pad be fully released onto the article to be printed, sometimes complete release is not achieved. Consequently, subsequent articles to be printed upon by the same printing pad member may have excessive ink or misaligned ink deposited thereon. Such improper ink deposition leads to unwanted ink contamination of balls, either directly between balls or indirectly by first transferring ink to ball handling equipment or both. Resolution of such problems requires expensive positioning equipment to prevent unwanted contact between balls, between ink depositing members and balls and between ball handling equipment and balls, respectively.

To overcome such ink transfer problems, intermediate thermal curing steps are introduced into the manufacturing process. There are several disadvantages to thermal curing, however. These include (1) high energy consumption, (2) long cooling cycles, (3) restricted material selection to thermally curable and thermally stable polymeric materials and (4) use of costly ventilating systems to dissipate vapors generated during thermal curing.

In addition to the problems associated with ink transfer before the ink is cured, post manufacturing problems are also commonly encountered even after curing takes place. Ink layers, after cure, may not possess a desirable level of adhesion to a substrate article surface. For example, a logo printed onto a golf ball topcoat is subjected to repeated "hard" impacts by a golf club during the golf ball's normal useful life. If adhesion, toughness, flexibility and/or hardness are at an undesirable level, ink deposited upon a topcoat (e.g., a logo printed upon a finished ball having an underlying topcoat or a clear coat) and/or ink deposited under a topcoat (e.g., a production print formed by the ink layer being interposed between the cover or primer coat and an overcoat and/or a topcoat) will abrade, flake, crack or otherwise separate from the golf ball topcoat, overcoat, the cover and/or the primer coat. After repeated impacts, such lack of adhesion, toughness, flexibility and/or hardness yields an unsightly golf ball.

The adhesion of the ink to the ball is in turn affected by the sufficiency of the curing of the ink. When the ink is not properly cured, it tends to detach from the surface of the golf ball. Separation of UV curable ink from the ball is more likely when the ink or ink layer is thicker because the ink is less likely to be completely through-cured, i.e. cured through the entire thickness of the UV curable ink coating.

Also, UV curable inks which contain certain colored pigments are more prone to insufficient curing, even when UV radiation or light is used to cure the coating. Pigments, particularly those which impart the colors black, blue, green or white to the ink, absorb the UV light which is necessary to activate the UV photoinitiators which initiate the curing of the ink. Specifically, these pigments and the UV photoinitiators absorb UV light having the same UV wavelengths. Because both the pigments and the UV photoinitiators are competing for the same UV radiation, some of the UV photoinitiators in the ink, particularly those below the ink layer's outer surface will not absorb enough energy needed to initiate the curing in the lower portions of the ink layer. Also, the UV photoinitiators at the surface of the ink absorb the UV light, thereby limiting the amount of UV light that penetrates to lower depths in the ink layer to permit curing of the ink layer at the substrate interface. As a result, insufficient curing often occurs. To remedy such deficiency, more energy and/or longer curing times can be used. However, increases in energy doses and curing time is not desirable since it leads to inefficient production of golf balls as well as potentially adverse effects on the golf ball materials. For example, to increase the curing energy, the line speed, i.e., the speed by which the balls are moved toward the curing energy source, must be reduced. This decrease in line speed tends to melt or sink the cover on the golf balls due to the heat output of the curing source. Therefore, there exists a need for a durable ink for golf balls which thoroughly cures upon exposure to UV/vis light without exposing the substrate to greater energy.

To overcome these and other drawbacks, inks used in production and logo printing must have sufficient durability. Durability is influenced by such factors as ink layer flexibility (i.e., ink layer brittleness), ink layer resistance to abrasion, ink layer hardness, adhesion to golf ball cover polymers such as ionomers (e.g., SURLYN®), balata, polyurethane, polyolefin mixtures thereof, adhesion to topcoats, adhesion to primer coats and intercoat adhesion between various layers of inks and/or other overcoats and/or topcoats.

To overcome these and other problems, novel inks (1) that are radiation curable and have a high cure rate (i.e., require low curing time) (2) that require minimal cooling, if any, (3) that are almost instantaneously cured, (4) that permit use of an extensive color palette for the pigments added to the ink and (5) that permit the use of a broader range of polymeric core, intermediate shell (or windings) or cover materials for use with golf balls and game balls are sought. These requirements are met by radiation curable inks which are the subject of the present invention.

SUMMARY OF THE INVENTION

It is therefore an object of the present invention to provide a novel, cost-effective and rapid radiation, particularly, UV/visible light curing method for forming an ink print on a curved surface such as that found on a game ball, a golf ball or the like.

Another object of the invention is to provide a radiation curable ink, in particular (an ink curable upon exposure to UV and visible light, having a high cure rate and allowing for the use of a wide range of color pigments in the ink.

It is another object of the present invention to provide a method of forming a logo or production print on such a game ball, golf ball, etc. curved surface with improved durability, flexibility, hardness, etc., by the use of radiation curing.

It is a further object of the present invention to provide radiation curable ink compositions having improved durability, flexibility, hardness, abrasion resistance, adhesion and ink transfer properties.

It is another object of the present invention to provide a radiation curable ink composition suitable for production printing on game balls, golf balls and the like (e.g., sports equipment such as club heads, helmets etc., and other curved surfaces) having improved durability, flexibility, hardness, abrasion resistance, adhesion and ink transfer properties.

It is a further object of the present invention to provide a radiation curable ink composition suitable for logo printing on game balls, golf balls and the like having improved durability, flexibility, hardness, abrasion resistance, adhesion and/or ink transfer properties.

These and other objects are accomplished by the use of a novel, cost-effective and rapid method of curing ink layers on the curved surfaces of game balls, golf balls or the like using radiation, particularly UV and visible light. In one embodiment of the invention, radiation curable water-insoluble inks are deposited on, e.g., a golf ball to produce a logo or a production print, which is thereafter cured by application of ultraviolet and visible light.

In another embodiment, the invention comprises radiation curable water-insoluble production ink for forming an inked surface on at least a portion of the surface of a game ball, golf ball or the like wherein at least the inked surface is coated with a topcoat. The ink comprises an ink base containing a prepolymer with at least two prepolymer functional moieties and a photoinitiator. The prepolymer is selected from the group consisting of a first acrylate, an ester and mixtures thereof and a polymerizable monomer.

To increase the cure rate of the ink a photoinitiator is added to the ink. The photoinitiator can also promote sufficient through-curing of the ink. Suitable photoinitiators include UV photoinitiators and visible light photoinitiators or combinations thereof, a more detailed discussion of which is provided below.

A visible light photoinitiator can be used in addition to or as a substitute for UV photoinitiators. Preferably, a combination of UV and visible light photoinitiators or a (photoinitiator having a significant portion of its absorbance spectrum in the visible regions), is included in the ink to promote the complete curing of the coating. As used herein, visible light photoinitiators refer to both photoinitiators which have an absorbance spectrum in both the UV and visible light regions as well as photoinitiators which have an absorbance spectrum only in the visible light region.

As noted earlier, pigments in inks (particularly black, blue, green and white ones) absorb at the same UV light wavelengths at which UV photoinitiators must absorb in order to start the curing of the ink. As a result, the UV photoinitiators in the ink beneath the surface of the ink layer will be deprived of adequate UV light by the pigments and curing of the ink will be limited to the upper ink layer. In other words, the UV photoinitiators and pigments compete for the same UV light.

By adding to an ink, with or without UV photoinitiators, a visible light photoinitiator which absorbs radiation having longer wavelengths than that absorbed by the pigments and UV photoinitiators, the speed and completeness of the through-cure of the ink will be increased. Also the amount of energy needed for through-cure can be reduced. Since the light source used for curing can be selected to emit light not only in the UV region of the spectrum (which is absorbed by the pigments), but also visible light at certain wavelengths, a visible light photoinitiator added to the ink can absorb such visible light, that is typically wasted during the curing of the ink and therefore more effectively initiate the curing of the ink. In other words, inclusion of a visible light photoinitiator will allow the ink to make use of light from a UV/vis light source which is not being absorbed by the pigments, thereby promoting the through-cure of the ink and more efficiently using the energy emitted by the light source.

Preferably, the visible light photoinitiator should have a substantial part of its absorbance spectrum (i.e., greater than about 50%) at wavelengths greater than about 400 nm. More preferably, the visible photoinitiator should have a maximum absorbance at a wavelength greater than about 400 nm. Also, the amounts of visible light photoinitiators that can be included in the ink range from about 0.01 to 3 parts per 100 parts ink.

In addition to one or more visible light photoinitiator(s), also added to the production ink base is an adhesion promoting component which may be a carboxylic acid functional monomer, a carboxylic acid functional oligomer, an ester functional monomer, an ester functional oligomer or mixtures thereof. The adhesion promoting component has at least one adhesion promoting functional moiety comprising at least about 2 moles of a carbonyl functionality per mole of the adhesion promoting component. It is sufficient to maintain adhesion of at least about 75% of the curved inked surface to the topcoat and to the surface of the game ball, golf ball or the like after curing and after coating with the topcoat.

A further embodiment is directed to a process for forming a production print on at least a portion of the curved surface of a game ball, golf ball or the like. For example, with golf balls, the process comprises providing a golf ball having a curved surface; coating at least a portion of the golf ball surface with at least a layer of a radiation curable water-insoluble production ink comprising the photoinitiators discussed above; curing the coating layer with UV and visible light; and coating at least the inked surface with a topcoat.

An additional embodiment of the present invention is directed to an improved UV/vis curable water-insoluble logo ink composition. The water-insoluble logo ink includes an ink base comprising a prepolymer having at least two prepolymer functional moieties and a photoinitiator. The prepolymer is selected from the group consisting of a first acrylate, an ester and mixtures thereof and at least a polymerizable monomer. Photoinitiators, including visible light photoinitiators, suitable for preparing the UV and/or visible light curable water-insoluble production inks of this invention are also used in formulating these logo inks.

Included in the logo ink base is a toughening agent. The toughening agent is sufficient to maintain adhesion of the logo ink to the topcoat of at least about 75% of the inked surface after curing. The toughening agent may be sterically hindered monomers, dimers, trimers or oligomers, such as sterically hindered acrylates. Preferably, the toughening agents are also reactive diluents, (i.e., they form covalent bonds upon polymerization and are incorporated into the structure of the ink layer).

A still further embodiment involves a process for forming a logo on a game ball or golf ball topcoat. For example, in the case of a golf ball, the process comprises providing a golf ball having a topcoated surface; coating at least a portion of the surface with at least a layer of an radiation curable water-insoluble logo ink, which comprises at least one photoinitiator; and curing the ink with radiation, e.g. ultraviolet and visible light.

While the present invention is described mainly in terms of a golf ball, it should be understood that a variety of additional curved substrates (e.g., game balls) may be printed upon using the ink formulations and methods described and claimed herein without departing from the scope of the present invention.

DETAILED DESCRIPTION OF THE PREFERRED EMBODIMENTS

Figure 1:
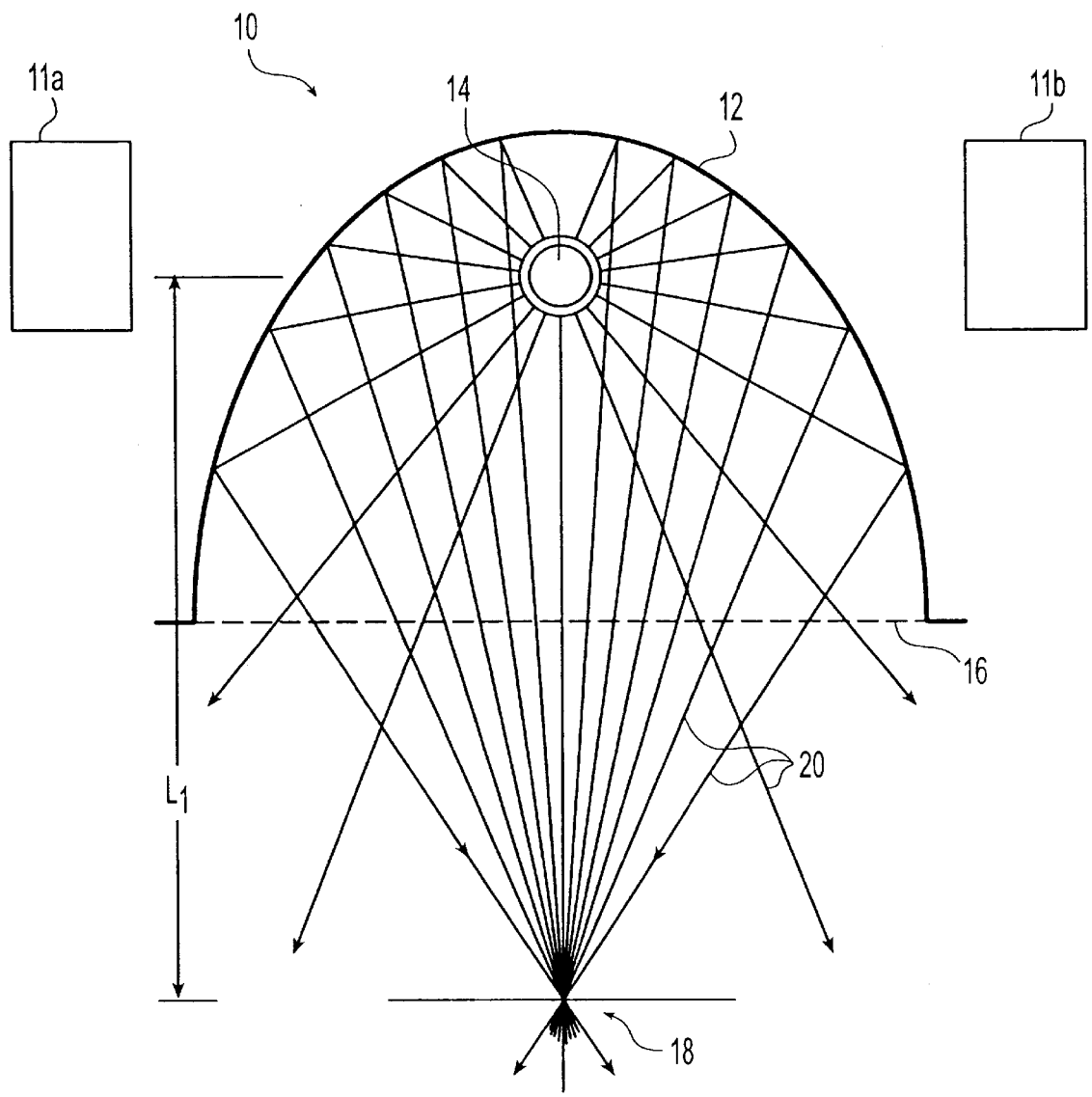
FIG. 1 is a schematic cross-sectional drawing of an exemplary radiation source.

The following detailed description is provided to aid those skilled in the art in practicing the present invention. However, it should not be construed to unduly limit the scope of the present invention. Variations and modifications in the embodiments discussed may be made by those of ordinary skill in the art without departing from the invention.

As used herein "radiation" refers to electromagnetic radiation having wavelengths in the ultraviolet and/or visible light regions of the spectrum. "Radiation curable", as used herein, refers to the ability to be cured with electromagnetic radiation having wavelengths in the ultraviolet and/or visible light regions of the spectrum.

The radiation curable water-insoluble production ink of the present invention is formed by modifying a base composition to incorporate at least an adhesion promoting component. The ink base composition comprises a prepolymer having at least two prepolymer functional moieties and a photoinitiator. The prepolymer is selected from the group consisting of a first acrylate, an ester and mixtures thereof and at least a polymerizable monomer.

Suitable first acrylates for use in conjunction with the present invention include, but are not limited to, acrylated amines, acrylic acrylates, oil acrylates, melamine acrylates, heterocyclic acrylates, epoxy acrylates, epoxy acrylates of bisphenol A, epoxy acrylates of bisphenol F, epoxy acrylates of bisphenol S, novolak acrylates, urethane acrylates, ether acrylates, polyether acrylates, thiol acrylates, thioether acrylates, polythioether acrylates, silicon acrylates, polystyryl acrylates, ester acrylates, polyester acrylates, aromatic acrylates, aliphatic acrylates, half-ester acrylates, di-ester acrylates, vinyl acrylates, polybutadiene acrylates, allyl acrylates, polyene acrylates, methacrylates, methacrylated amine, acrylic methacrylates, methacrylic methacrylates, oil methacrylates, melamine methacrylates, heterocyclic methacrylates, epoxy methacrylates of bisphenol A, epoxy methacrylates of bisphenol F, epoxy methacrylates of bisphenol S, novolak methacrylates, urethane methacrylates, ether methacrylates, polyether methacrylates, thiol methacrylates, thioether methacrylates, polythioether methacrylates, silicon methacrylates, polystyryl methacrylates, ester methacrylates, polyester methacrylates, aromatic methacrylates, aliphatic methacrylates, half-ester methacrylates, di-ester methacrylates, vinyl methacrylates, polybutadiene methacrylates, allyl acrylates, polyene methacrylates and the like and mixtures thereof.

The first acrylates are acrylated prepolymers having high molecular weights, for example, of at least about 500 grams per mole and have at least 2 polymerizable functionalities (i.e., prepolymer moieties) per molecule of prepolymer. Often, the acrylated prepolymers and the ester prepolymers have a high viscosity (e.g., 100–20,000 centipoise at 25° C.) and a molecular weight from about 500 to about 5,000 grams per mole and from about 2 to 6 reactive prepolymer functional moieties per molecule. The ester may be an unsaturated ester.

The polymerizable monomers are considered reactive diluents. They may be monofunctional monomers or polyfunctional monomers. These polymerizable monomers are used to modify (e.g., typically to reduce) the viscosity of the acrylate prepolymer or the ester prepolymer. However, these monomers primarily aid in the cross-linking of the prepolymers upon curing thereof. These monomers include, but are not limited to, one or more monofunctional acrylates or one or more polyfunctional acrylates. For example, the monofunctional acrylates have one acryloyl or methacryloyl group per acrylate molecule whereas the polyfunctional acrylates have two or more acryloyl or methacryloyl groups per acrylate molecule.

Theoretically, upon exposure to UV and/or visible light it is conceivably possible to cure (i.e., polymerize) a polymerizable ink without a photoinitiator. In practice, however, a photoinitiator is required to achieve an economically feasible cure rate (i.e., increased cure rate). Increased cure rates yield higher production rates and lower per unit production costs of various inked articles such as game balls, golf balls and the like.

Examples of ultraviolet light photoinitiators compatible with the ink base of the present invention (e.g., ink base for production ink or ink base for logo ink) include free radical photoinitiators. (See Jean-Pierre Fouassier, *Photoinitiators and Photosensitizers of Polymerization: A Short Review*, Vol. 6, European Coatings Journal, pp. 412–419 (1996). Specific examples of free radical photoinitiators include, but are not limited to, oligo(2-hydroxy-2-methyl-1-(4-(1-methylvinyl)phenyl)propanone), 2-hydroxy-2-methyl-1-phenyl-1-propanone, 2,4,6-trimethylbenzophenone, 4-methylbenzophenone, 2,2-dimethoxy-1,2-diphenylethanone, 2-butoxy-1,2-diphenylethanone, 2-(2-methyl propoxy)-1,2-diphenylethanone, benzophenone, 2-alpha hydroxy ketone, other alpha hydroxy ketones, other benzophenone derivatives or mixtures thereof. Other photoinitiators (i.e., photopolymerization initiators) compatible and suitable for use with the inks of the present invention are well known in the art. Additional examples of suitable photoinitiators are listed in U.S. Pat. No. 4,670,295 (Quinn et al.) and U.S. Pat. No. 4,680,368 (Nakamoto et al.), which are incorporated herein by reference in their entirety.

A preferred photoinitiator is Esacure™ KIP-100F that is commercially available from Sartomer. This photoinitiator (Esacure™ KIP-100F) is a liquid mixture of 70% by weight of oligo(2-hydroxy-2-methyl-1-(4-(1-methylvinyl)phenyl) propanone) with a M.W.=204.7 grams/mole per repeating unit and 30% by weight of 2-hydroxy-2-methyl-1-phenyl-1-propanone with a M.W.=164.2 grams/mole. This commercially available photoinitiator is a highly reactive, non-yellowing initiator for the polymerization of radiation curable inks. It is further characterized by the following physical properties:

Appearance Clear, slightly yellow viscous liquid
Odor Faint, characteristic
Solubility Insoluble in water, soluble in most common organic solvents, monomers, prepolymers. Compatible with resins.
Boiling Point >200° C.
Flash Point 110° C. (Closed cup-Pensky-Martens)
Density 1.1 g/cm$^3$ at 20° C.
Viscosity 15–30 Pa.s. (Brookfield 20 rpm 20° C.)
CAS No. 7473-98-5

In accordance with the present invention, the photoinitiator(s) is/are added to the ink base in an amount sufficient to increase the cure rate of a radiation curable ink. However, photoinitiators are typically extremely expensive. Therefore, it is preferable to use a minimum amount of photoinitiator without unduly sacrificing cure rates, production rates or production costs. For example, the photoinitiator is present from about 0.05% to about 15% by weight of the total weight of the ink. However, it is preferred to use from about 0.05% to about 5% of the photoinitiator, more preferably, from about 0.1% to about 0.5% by weight. For example, 0.1% of Esacure™ KIP-100F is sufficient to formulate an radiation curable production ink or logo ink according to the present invention.

Other suitable commercially available photoinitiators include, but are not limited to, 1-hydroxy cyclohexyl phenyl ketone (Irgacure™ 184); n$^5$-2,4-cyclopentadien-1-yl) ((1,2,3,4,5,6-n)-(1-methyl ethyl)benzene)-iron (+)-hexafluorophosphate (-1) (Irgacure™ 261); 2-benzyl-2-n-dimethylamino-1-(4-morpholinophenyl)-1-butanone (Irgacure™ 369); 1-hydroxycyclohexyl phenyl ketone (50% by weight) plus benzophenone (50% by weight) (Irgacure™ 500); bis(2,6-dimethoxy benzoyl)-2,4,4 trimethylpentyl phosphineoxide (DMBAPO) (25% by weight) plus 2-hydroxy-2-methyl-1-phenylpropan-1-one (HMMP) (75% by weight) (Irgacure™ 1700); 4-(2-hydroxyethoxy) phenyl-(2-hydroxy propyl)ketone (Irgacure™ 2959); 2,4,6-Trimethyl benzoyl diphenyl phosphineoxide (TPO) (50% by weight) plus 2-hydroxy-2-methyl-1-phenyl-propan-1-one (HMPP) (50% by weight) (Darocur™ 4265); 2,2-dimethoxy-2-phenylacetophenone (BDK) (Irgacure™ 651); bis($n^5$-2,4-cyclopentadien-1-yl), bis (2,6-difluoro-3-(1H-pyrrol-1-yl)phenyl) Titanium (CGI-784); 2-methyl-1-(4-(methylthio)phenyl)-2-morpholino propan-1-one (MMMP) (Irgacure™ 907); 2-hydroxy-2-methyl-1-phenyl-propan-1-one (HMPP) (Darocur™ 1173); or mixtures thereof. These photoinitiators are commercially available from Ciba-Geigy.

In addition, the ink base preferably includes visible light photoinitiator(s) (i.e., a photoinitiator having at least a part of its absorbance spectrum in the visible region or photoinitiator having its entire absorbance spectrum in the visible light region). These visible light photoinitiators can be used in conjunction with or as substitutes for UV photoinitiators. Preferably, a combination of UV and visible light photoinitiators are used. More preferably, the visible light photoinitiator(s) should have a substantial portion, i.e., greater than about 50% of its absorbance spectrum at wavelengths greater than about 400 nm. Even more preferable, the visible light photoinitiator should have a maximum absorbance at wavelengths greater than about 400 nm.

When a combination of UV and visible light photoinitiators or photoinitiators having an absorbance spectrum in both the UV and visible light regions are used in the ink, the ink is cured using UV and visible light. When only UV photoinitiators or only visible light photoinitiators having an absorbance spectrum only in the absorbance spectrum are used, then the ink may be cured using only UV or only visible light, respectively.

Visible light photoinitiators which are particularly suitable for the present invention include fluorene derivatives such as those described in U.S. Pat. No. 5,451,343 to Neckers et al., U.S. Pat. No. 5,395,862 to Neckers et al. and Dietliker, *Chemistry & Technology of UV & EB Formulation for Coatings, Inks & Paints*, vol. III, pp. 228–299, Selective Industrial Training Assocs. Ltd. (1991) (the contents of which are incorporated herein by reference for all purposes).

Preferred fluorene derivatives useful as visible light photoinitiators are 5,7-diiodo-3-butoxy-6-fluorene (with a maximum absorbance at 470 nm); 2,4,5,7-tetraiodo-3-hydroxy-6-fluorene (with a maximum absorbance at 535 nm); and 2,4,5,7-tetraiodo-9-cyano-3-hydroxy-6-fluorene (with a maximum absorbance at 635 nm), all of which are available from Spectra Group Limited, Inc.

Moreover, depending upon the photoinitiator, one or more co-initiators may be used in combination with the visible light photoinitiator to enhance the curing of the ink. One of skill in the art is aware of whether a given visible light photoinitiator should be used with a co-initiator and which co-initiator(s) should be combined with the photoinitiator.

For example, when fluorene derivatives are used as visible light photoinitiators, an onium salt and/or an aromatic amine can be used as co-initiators. Suitable onium salts include iodonium salts (e.g. phenyl-4-octyloxyphenyliodonium hexafluoroantimonate (OPPI), dodecyldiphenyliodonium hexafluoroantimonate (DDPI), and (4-(2-tetradecanol)-oxyphenyl)iodonium hexafluoroantimonate); sulfonium salts; pyrylium salts; thiapyrylium salts; diazonium salts and ferrocenium salts. Suitable amine co-initiators include N,N-dimethyl-2,6-diisopropylaniline (DIDMA), ethyl- or octyl-para-(dimethylamino)benzoate (EDAB or ODAB respectively) and N-phenylglycine (NPG).

Additionally, triarylalkyl-borate ammonium salts can be used in conjunction with the fluorene visible light photoinitiator instead of the amine co-initiator. Examples of such borate co-initiators include tetramethylammonium triphenylbutyl borate and butyryl choline triphenyl butylborate (available from Spectra Group Limited).

Other visible light photoinitiators that are useful for this invention include without limitation titanocene photoinitiators (particularly fluorinated diaryl titanocenes such as bis ($\eta^5$-cyclopentadienyl) bis-[2,6-difluoro-3-(1lH-pyrr-1-yl) phenyl]-titanium); ketocoumarine photoinitiators (e.g. 3-ketocoumarine); acridine dyes (e.g. acriflavine); xanthene dyes (e.g. rose bengale or fluorescein); azine dyes, thiazine dyes (e.g. methylene blue); and polymethine dyes (e.g. cyanines or merocyanines).

Examples of co-initiators which are compatible with the "dye" photoinitiators include amines (e.g. triethanolamine); phosphines/arsines (e.g. triphenylphosphine or triphenylarsine); sulphinates (e.g. sodium p-tolysulphinate); enolates (e.g. dimedone enolate); carboxylate (e.g. ascorbic acid); organotin compounds (e.g. benzyltrimethylstannane); borates (e.g. triphenyl borate); and trichloromethyl-s-triazines.

Because of their efficient absorptivity of visible light, the amounts of visible light photoinitiators used in the ink is generally less than the amounts of UV photoinitiators used. In one embodiment, from about 0.01 to 3 parts per 100 parts ink of visible light photoinitiators is included in the ink. Preferably about 0.02 to 0.1 parts is used and more preferably about 0.05 to 0.07 parts is included.

The ratio of the visible light photoinitiator to co-initiator (s) can range from about 1:5 to 1:30. More preferably the ratio is about 1:10 to 1:25 and even more preferably from about 1:20 to 1:25.

Furthermore, an adhesion promoting component is added, as noted above, to the ink base in forming a production ink. The adhesion promoting component improves the adhesion of the production ink to, for example, a golf ball cover or a primer coat when applied thereto and after being cured by radiation. The adhesion promoting component also improves the adhesion of the ink to a topcoat (e.g., a urethane topcoat) or to an overcoat (e.g., a water based urethane coat or a solvent based coat) when such coats are applied over the cured production ink.

The adhesion promoting component is selected from among carboxylic acid functional monomers, carboxylic acid functional oligomers, ester functional monomers, ester functional oligomers and mixtures thereof. The adhesion promoting component has at least one adhesion promoting functional moiety comprising at least about 2 moles of a carbonyl functionality per mole of the adhesion promoting component. The adhesion promoting component is added to the ink base to promote intercoat adhesion of the production ink. Intercoat adhesion, as used herein, is defined as adhesion to an underlying cover and/or primer coat and adhesion to an overlying topcoat and/or overcoat.

Preferably, the adhesion promoting component is selected from acrylate oligomers, aromatic acid acrylate esters, aromatic acid acrylate half esters, aromatic acid methacrylate esters, aromatic acid methacrylate half esters and mixtures thereof. The adhesion promoting component has at least about 2 moles of a carbonyl functionality, typically from about 3 to about 12 moles of a carbonyl functionality per mole of the adhesion promoting component or any value therebetween. Preferably, the adhesion promoting component has from about 3.5 to about 11 moles of a carbonyl functionality per mole of the adhesion promoting component. Further, the adhesion promoting component has a molecular weight of about 1,000,000 grams per mole or less, typically from about 100 grams per mole to about 1,000,000 grams per mole.

The carbonyl functionality of the adhesion promoting component can be a carboxylic acid functional moiety, an ester functional moiety, an anhydride functional moiety or a mixture thereof. Preferably, the adhesion promoting functional moiety is a carboxylic acid having, for example, an acid number of at least about 100. The acid number is defined as the quantity of base, expressed in milligrams of potassium hydroxide, that is required to neutralize the free acids present in one gram (1 gm) of the adhesion promoting component present in the production ink, logo ink, etc. The acid number of the adhesion promoting component is about 300 or less, typically from about 100 to about 300 or any number therebetween. Preferably the acid number is from about 150 to about 250 and most preferably from about 200 to about 230.

Further, the adhesion promoting component is present in an amount of at least about 1% by weight of the total weight of the production ink. All weight percentages provided below are relative to the total weight of the ink containing a given component unless specifically indicated otherwise. The adhesion promoting component is present in an amount of about 75% by weight or less, typically from about 1% to about 60% or any value therebetween (e.g., 10–20%) and, most preferably, from about 5% to about 25% by weight.

Examples of suitable adhesion promoting components include products from SARTOMER Company, Inc. (Exton, Pa.) designated as SARBOX™ SB-501, SARBOX™ SB-401, SARBOX™ SB-510E35 and SARBOX™ SB-520E35. SB-501 is a highly functional, carboxylic acid terminated oligomer blended in 40% by weight (of the total weight of SB-501) of ethoxylated trimethylolpropane triacrylate monomer (designed as SR-454). SB-501 is further characterized as indicated below:

| Color, APHA | 100–200 |
| Weight/gallon (lbs./gal.) | 9.7–9.9 |
| Viscosity (cps) | |
| 25° C. | 200,000+ |
| 40° C. | 75,000–90,000 |
| 60° C. | 8,000–15,000 |
| 80° C. | 2,500–4,000 |
| Acid Number (mg KOH/gm) based on SARBOX ™ Resin Content | 130–180 |
| SARBOX ™ Resin Content (%) | 60.0 ± 2.0 |
| Flash Point (° F., Setaflash) | 200. |

SB-401 is a highly functional, carboxylic acid terminated, solid oligomer dissolved in 30% by weight (of the total weight of SB-401) of solvent. SB-401 is further characterized as indicated below:

| Color, APHA | 150–250 |
| Weight/gallon (lbs./gal.) | 9.3–9.6 |
| Viscosity (cps) | |
| 25° C. | 40,000–60,000 |
| 40° C. | 10,000–20,000 |
| 60° C. | 2,000–4,000 |
| Acid Number (mg KOH/gm) based on SARBOX ™ Resin Content | 130–160 |
| SARBOX ™ Resin Content (non-volatile content, %) | 68.0 ± 2.0 |
| Flash Point (° F., PMCC, Solvent) | 136. |

SB-510E35 is a 35% by weight (of the total weight of SB-510E35) moderately functional carboxylic acid containing methacrylate oligomer (i.e., aromatic acid methacrylate half ester resin) blended in 65% by weight (of the total weight of SB-510E35) of ethoxylated trimethylolpropane triacrylate monomer (designated as SR-454, the chemical structure of which is incorporated herein by reference). SB-510E35 is further characterized as indicated below:

| Color, APHA | 150–250 |
| Weight/Gallon (lbs/gal.) | 9.70–9.90 |
| Viscosity (cps) | |
| 25° C. | 80,000–120,000 |
| 40° C. | 40,000–60,000 |
| 60° C. | 3,500–7,000 |
| Acid Number (mg KOH/gm) based on SARBOX ™ Resin Content | 200–230 |
| SARBOX ™ Resin Content (%) | 35 ± 2 |
| Flash Point (° F., Setaflash) | >200 |

SB-520E35 is a 35% by weight (of the total weight of SB-520E35) moderately functional carboxylic acid containing acrylate oligomer (i.e., aromatic acid acrylate half ester resin) blended in 65% by weight (of the total weight of SB-520E35) of ethoxylated trimethylolpropane triacrylate monomer (designated as SR-454). SB-520E35 is further characterized as indicated below:

| Color, APHA | 150–250 |
| Weight/Gallon (lbs/gal.) | 9.70–9.90 |
| Viscosity (cps) | |
| 25° C. | 80,000–120,000 |
| 40° C. | 40,000–60,000 |
| 60° C. | 3,500–7,000 |
| Acid Number (mg KOH/gm) based on SARBOX ™ Resin Content | 200–230 |
| SARBOX ™ Resin Content (%) | 35 ± 2 |
| Flash Point (° F., Setaflash) | >200 |

Both SB-510E35 and SB-520E35 contain 100% reactive solids. These products are described in SARTOMER COMPANY PRODUCT MANUAL AND APPLICATION GUIDE.

The production ink of the present invention may further comprise a viscosity reducing component and/or a flexibility promoting component. The viscosity reducing component is any low molecular weight reactive diluent that reduces the viscosity of the production ink. Examples of viscosity reducing components (produced and sold by the SARTOMER Company) compatible with the present invention include, but are not limited to, highly propoxylated glyceryl triacrylate (SR-9021), ethoxylated$_3$ trimethylolpropane triacrylate (SR-454), ethoxylated$_6$ trimethylolpropane triacrylate (SR-499), ethoxylated$_9$ trimethylolpropane triacrylate (SR-502), ethoxylated$_{15}$ trimethylolpropane triacrylate (SR-9035), ethoxylated$_{20}$ trimethylolpropane triacrylate (SR-415), pentaerythritol triacrylate (SR-444), propoxylated glyceryl triacrylate (SR-9020), propoxylated$_3$ trimethylolpropane triacrylate (SR-492), propoxylated$_6$ trimethylolpropane triacrylate (SR-501), trimethylolpropane triacrylate (SR-351), trimethylolpropane trimethylacrylate (SR-350), tris(2-hydroxy ethyl) isocyanurate triacrylate (SR-368, SR-368D and SR-290), dipentaerythritol pentaacrylate (SR-399), di-trimethylolpropane tetraacrylate (SR-355), ethoxylated pentaerythritol tetraacrylate (SR-494), pentaacrylate ester (SR-9041), pentaerythritol tetraacrylate (SR-295) and mixtures thereof. The preferred viscosity reducing agent is ethoxylated$_3$ trimethylolpropane triacrylate (SR-454) having a molecular weight of about 428 grams. Typically, the viscosity reducing component is present from about 10% to about 50% by weight of the total weight of the adhesion promoting component or any value therebetween and, preferably, from about 0.1% to about 37.5%.

The flexibility promoting component compatible with the present invention has a post cure elastic modulus of from about 200 to about 60,000 pounds per square inch, a post cure tensile strength from about 50 to about 2,500 pounds per square inch, a post cure elongation from about 5% to about 350% and a glass transition temperature (i.e., Tg) below about room temperature (e.g., below about 25° C.). The flexibility promoting component includes, but is not limited to, a second acrylate, a ring opening heterocycle and mixtures thereof, wherein the ring opening heterocycle is selected from the group consisting of cyclic esters, cyclic lactones, cyclic sulphides, cyclic acetals, cyclic siloxanes and mixtures thereof. The second acrylate is selected from the group consisting of an aliphatic urethane acrylate, an aromatic urethane acrylate, a polyether acrylate, an acrylated amine, a polybutadiene acrylate, a melamine acrylate and mixtures thereof. The cyclic ester of the flexibility promoting component includes an epoxide.

Additional examples of flexibility promoting components compatible with the present invention include, but are not limited to, urethane acrylate base resins designated by the SARTOMER Company as CN-962, CN-965, CN-966, CN-972, CN-973 and CN-981 and urethane acrylate resin/monomer blends designated as CN-965A80, CN-966A80, CN-966H90, CN-966J75, CN-973A80, CN-973H85, CN-973J75 and CN-981B88 and described in the SARTOMER COMPANY PRODUCT MANUAL AND APPLICATION GUIDE. Of these, CN-962, CN-965 and CN-966 are aliphatic urethane acrylate oligomers having a polyester backbone. CN-973 is an aromatic urethane acrylate having a polyester backbone. CN-972 is an aromatic urethane acrylate having a polyester backbone. CN-981 is an aliphatic urethane acrylate having a polyester backbone. In CN-965A80, CN-966A80, CN-966H90, CN-966J75, CN-973A8, CN-973H85, CN-973J75 and CN-981B88, the CN-966, CN-973 and CN-981 are the base resins, respectively. The letters A, B, H and J as used in the SARTOMER product designations refer to the monomers blended with the base resins. The number following the monomer letter designation indicates the percent by weight of the base resin, the remainder being the amount of the monomer making up the blend (i.e., totalling 100% by weight). Monomers A, B, H and J correspond to the SARTOMER designations tripropylene glycol diacrylate (SR-306), 1,6-hexanediol diacrylate (SR-238), 2(2-ethoxyethoxy) ethylacrylate (SR-256) and isobornyl acrylate (SR-506), respectively.

The flexibility promoting component is optionally added to the production ink composition in an amount of about 75% by weight or less, typically from about 5–60% by weight or any value therebetween. Preferably, the flexibility promoting component is present from about 10–30% by weight and, most preferably, from about 15–20% by weight.

Additionally, the production ink may optionally contain a solvent in an amount from about 1–30% by weight of the total weight of the ink composition. Examples of solvents compatible with the present invention include, but are not limited to, (*Fast Evaporating Rate Solvents*): acetone, ethylacetate (85–88%), ethyl acetate (95–98%), ethyl acetate (99%), methyl acetate (80%), methyl ethyl ketone, iso-propyl acetate (95–97%), iso-propylether, tetrahydrofuran; (*Medium Evaporating Rate Solvents*): iso-butyl acetate (90%), n-butyl acetate (90–92%), n-butyl acetate (99%), sec-butyl acetate (90%), sec-butyl alcohol, tert-butyl alcohol, 1,1,1-trichloroethane, ethyl ketone, ethyl alcohol 200 PRF. ANHD, ethyl alcohol 190 PRF. ANHYD, ethyl alcohol 190 PRF. (95%), methyl alcohol, methyl isobutyl ketone, methyl isopropyl ketone, methyl n-propyl ketone, 2-nitropropane, n-propyl acetate (90–92%), iso-propyl alcohol, n-propyl alcohol; (*Slow Evaporating Rate Solvents*): amyl acetate (ex Fuel Oil) (85–88%), amyl acetate primary (mixed isomers)(95%), amyl alcohol primary (mixed isomers), tert-amyl alcohol, iso-butyl alcohol, n-butyl alcohol, butyl dioxitol™ glycol ether, butyl oxitol™ glycol ether, m-cresol, cyclohexanol, cyclohexanone, diacetone alcohol, dibasic ester, diethylene glycol, diethylene glycol monobutyl ether acetate (95%), diisobutyl ketone, dimethyl formamide, diethylene glycol, monomethyl ether-low gravity, diethylene glycol monomethyl ether-high gravity, dipropylene glycol monomethyl ether, dipropylene glycol monomethyl ether acetate, ethyl butyl ketone, ethyl-3-ethoxy propionate, ethylene glycol, 2-ethyl hexanol, 2-ethyl hexyl acetate (95%), ethylene glycol monomethyl ether acetate (95%), ethylene glycol monomethyl ether acetate (99%), ethylene glycol monobutyl ether acetate, hexylene glycol, isobutyl isobutyrate, isophorone, methyl n-amyl ketone, diethyl glycol monomethyl ether, methyl isoamyl ketone, methyl isobutyl carbinol, ethylene glycol monomethyl ether, n-methyl-2-Pyrrolidone, ethylene glycol monomethyl ether, propylene glycol, propylene glycol monomethyl ether, propylene glycol monomethyl ether acetate, propylene glycol mono tertiary butyl either, triethylene glycol; (*Aliphatic Hydrocarbon Solvents*): Mineral spirits, naphtha, or mixtures thereof and (*Aromatic Hydrocarbon Solvents*): Toluene, xylene or mixtures thereof. These solvents may be obtained from the Shell Chemical Company, Exxon (Houston, Tex.) or Eastman Chemical Co., (Kingsport, Tenn.). Additional solvents well known in the art may be used.

Faster evaporating solvents are preferred for higher production rates (i.e., more balls production printed or logo printed per unit time). However, faster evaporating solvents typically produce higher levels of volatile organic compounds (VOCs) per unit time making them susceptible to greater EPA regulation. On the other hand, slower evaporating solvents produce lower VOCs per unit time, but require longer drying times thereby lowering production rates.

The production inks may also optionally contain colorants such as pigments or dyes that are well known to those skilled in the ink formulation art in amounts sufficient to impart a desired color.

The logo ink of the invention differs from the production ink in that it contains different additive components due to differences in performance requirements of logos versus production prints. The logo ink comprises an ink base and at least a toughening agent. A further, optional additive to the logo ink base is a friction reducing agent commonly referred to as a slip and mar agent. For logos, the same ink base as described for the production inks is used, i.e., comprising a prepolymer having at least two prepolymer functional moieties, wherein the prepolymer is a first acrylate, an ester or mixtures thereof and a polymerizable monomer. Further, the ink base contains a photoinitiator. The photoinitiators compatible with logo inks are the same as those compatible (as previously listed) with production inks. Further, the percent by weight amounts of the photoinitiators compatible with production inks are also compatible with logo inks. Thus, for example, the ultraviolet light photoinitiator is present in a logo ink from about 0.05% to about 15%, preferably, from about 0.05% to about 5% and, most preferably, from about 0.1% to about 0.5%. Esacure™ KIP-100F (at 0.1% by weight of the total weight of the logo ink) is a preferred commercially available ultraviolet light photoinitiator that is compatible with the logo ink of the present invention. Other commercially available photoinitiators, discussed above in connection with production inks, may be used as well. Also preferably present as a component of the logo inks of the present invention are the visible light photoinitiators in the quantities described above in relation to the production ink. Preferably, the visible light photoinitiator should have a substantial portion, i.e., greater than about 50% of its absorbance spectrum at wavelengths greater than about 400 nm. Even more preferable, the visible light photoinitiator should have a maximum absorbance at wavelengths greater than about 400 nm. Such visible light photoinitiators are generally combined with one or more ultraviolet light photoinitiators (such as those described earlier) to promote complete curing of the ink.

Preferred fluorene derivatives useful as visible light photoinitiators are 5,7-diiodo-3-butoxy-6-fluorene (with a maximum absorbance at 470 nm); 2,4,5,7-tetraiodo-3-hydroxy-6-fluorene (with a maximum absorbance at 535 nm); and 2,4,5,7-tetraiodo-9-cyano-3-hydroxy-6-fluorene (with a maximum absorbance at 635 nm), all of which are available from Spectra Group Limited, Inc.

Suitable toughening agents are sterically hindered acrylates, preferably, monomers, dimers, trimers or oligomers. Further examples of toughening agents compatible ith the logo inks of the present invention include, but are not limited to, epoxy acrylate, isobornyl acrylate (SR-506), tetrahydrofurfuryl acrylate, cyclohexyl acrylate, dicyclopentenyl acrylate, dicyclopentenyl oxyethyl acrylate, vinyl toluene (styrene), isobornyl methacrylate, tetrahydrofurfuryl methacrylate, cyclohexyl methacrylate, dicyclopentenyl methacrylate, dicyclopentenyl oxyethyl methacrylate and mixtures thereof. The toughening agents preferably are reactive diluents which increase both the hardness and the flexibility of the ink base to yield a logo ink.

The toughening agent is present typically from about 5–75% by weight, or any value therebetween, of the total weight of the logo ink, preferably, from about 5–30% by weight and, most preferably, from about 10–20% by weight.

In addition to the toughening agent, as noted above, a friction reducing agent may be optionally added to the base ink to form a preferred logo ink. The friction reducing agent minimizes abrasion of the logo ink by sand, dirt and other abrasive materials or surfaces commonly encountered during golfing or during other typical uses of game balls. The friction reducing agent decreases the friction between the logo (i.e., surface printed with the logo ink) and external abrasive materials on contact, thereby minimizing the degradation of the logo. Examples of friction reducing agents compatible with the logo ink of the present invention include, but are not limited to, a solution of polyether modified dimethylpolysiloxane copolymer (BYK™-306; BYK™-341; BYK™-344), polyether modified dimethylpolysiloxane copolymer (BYK™-307; BYK™-333), a solution of acrylic functional, polyester modified dimethylpolysiloxane (BYK™-371), silicon acrylates and mixtures thereof. Of these, the reactive friction reducing agents such as silicon acrylates and acrylic functional, polyester modified dimethylpolysiloxanes (BYK™-371) are preferred because they form bonds and become integrated into the structure of the logo ink upon curing. The BYK™ friction reducing agents are listed in the BYK product catalogue and may be obtained from BYK-Chemie USA of Wallingford, Conn. The friction reducing agents (e.g., dimethylpolysiloxanes) can be obtained from various companies such as Dow Corning (Midland, Mich.) and OSI Specialties (Endicott, N.Y.).

The friction reducing agent is present in an amount of about 10% by weight (of the total weight of the logo ink) or less, typically, from about 0.1–10% by weight or any value therebetween, preferably, from about 0.6–4% by weight and, most preferably, from about 1–2% by weight.

The logo ink may further comprise from about 1–50% by weight of solvent, preferably about 30% by weight. Suitable logo ink solvents are the same as those previously listed for use with production inks. It should be noted that certain volatile solvents evaporate to varying degrees. Thus, it is often necessary to continuously or intermittently replenish the volatilized solvent to maintain from about 1–50% of the solvent in the ink composition.

In the case of logo inks, the ink is first deposited, for example, on a golf ball topcoat. Then, the solvent is optionally removed by flashing. Finally, the logo ink is radiation cured. In contrast, the production ink layer is first deposited directly upon the cover surface or primer coat. Then, the solvent is optionally removed by flashing. Thereafter, the ink layer is cured. Finally, overcoats and/or topcoats are applied to the radiation cured ink layer to form a production print. Further, during the curing step, to prevent overheating of the ink layers (e.g., production ink layers or logo ink layers), topcoats, overcoats and/or other parts of the substrate (e.g., golf ball) as well as the radiation lamps, one or more cooling gases (e.g., circulated by a cooling fan) may be provided to envelope the substrate and to dissipate heat. Such gases should be non-reactive with the substrate, the ink layers, the topcoat, the overcoat and/or other layers, especially during exposure to the radiation, e.g. UV and/or visible light. Examples of suitable cooling gases include, but are not limited to, the inert gases (e.g., helium, argon etc.), nitrogen, air or mixtures thereof. Other suitable gases are known to those skilled in the art.

It is believed, although applicant is not bound by this theory, that radiation, e.g. UV and/or visible light exposure ionizes components, for example, within the ink and/or a layer in contact with such ink. Further, without being bound by theory, it is believed that the photoinitiator within the ink formulation absorbs radiation and yields reactive intermediates such as free radicals through intermolecular and/or intramolecular interactions. These reactive intermediates increase the cross-linking rate (e.g., photopolymerization rate) of the various components of the inks of the present invention with the substrate layers or articles in contact with such inks. The cross-linking imparts greater durability, intercoat adhesion, abrasion resistance and the like to production prints or logos printed with such inks.

Once the inks are applied and any solvents optionally removed by flashing (e.g., with infrared heat, or held at ambient temperature for 10–30 minutes or heated by forced hot air to a ball surface temperature of about 120° F. or less for about 8–60 seconds), these inks are cured. Curing is carried out rapidly by the novel and cost-effective use of radiation, e.g. UV and/or visible light (e.g., on golf balls) as follows.

The radiation for curing the ink can be produced from a UV and visible light source. If photoinitiators which only absorb UV or only visible light are used, then the radiation can be produced from a source which only emits UV or visible light, respectively.

For example, with reference to FIG. 1, in a rudimentary form, the radiation or light source 10 comprises a power source (e.g., a pair of electrodeless microwave generators 11a and 11b), a reflector 12, a UV and visible light emitting bulb 14 and an optional microwave screen 16 (i.e., a microwave screen is used when the power is provided by an electrodeless microwave power supply). Input power from the power source to the bulb 14 causes the bulb 14 to emit radiation 20 in the visible wavelength range from about 400 to about 450 nanometers and in the ultraviolet wavelength range from about 200 nanometers to about 400 nanometers, preferably, from about 250 nanometers to about 400 nanometers and, more preferably, from about 300 nanometers to about 370 nanometers. When visible light photoinitiators are included in the ink, the bulb should emit visible light at wavelengths which can be absorbed by these photoinitiators. Often light sources can emit both UV and visible light. Examples of such sources include metal halide bulbs and xenon bulbs. Other suitable bulbs are known in the art.

Also, a separate visible light emitting bulb can be used in conjunction with a UV light emitting bulb such as a mercury bulb. The visible light and UV bulbs can be arranged in tandem. Preferably, the source at least partially emits visible light at the wavelength of maximum absorbance by the visible light photoinitiators.

Also suitable as bulbs are excimer lamps. An excimer is a molecule pair which may exist only briefly in a high-energy state, but has shared electrons whose energy levels can be used to produce intense UV light. Such lamps are described in Stowe, "New Developments in UV Curing", *The Coatings Agenda America*, 1997/98, pp. 162–64.

A portion of the ultraviolet and visible emissions 20 from the bulb 14 are reflected by the reflector 12 and propagated through the microwave screen 16 towards the focal point 18 situated at a distance $L_1$ from bulb 14.

Figure 2:
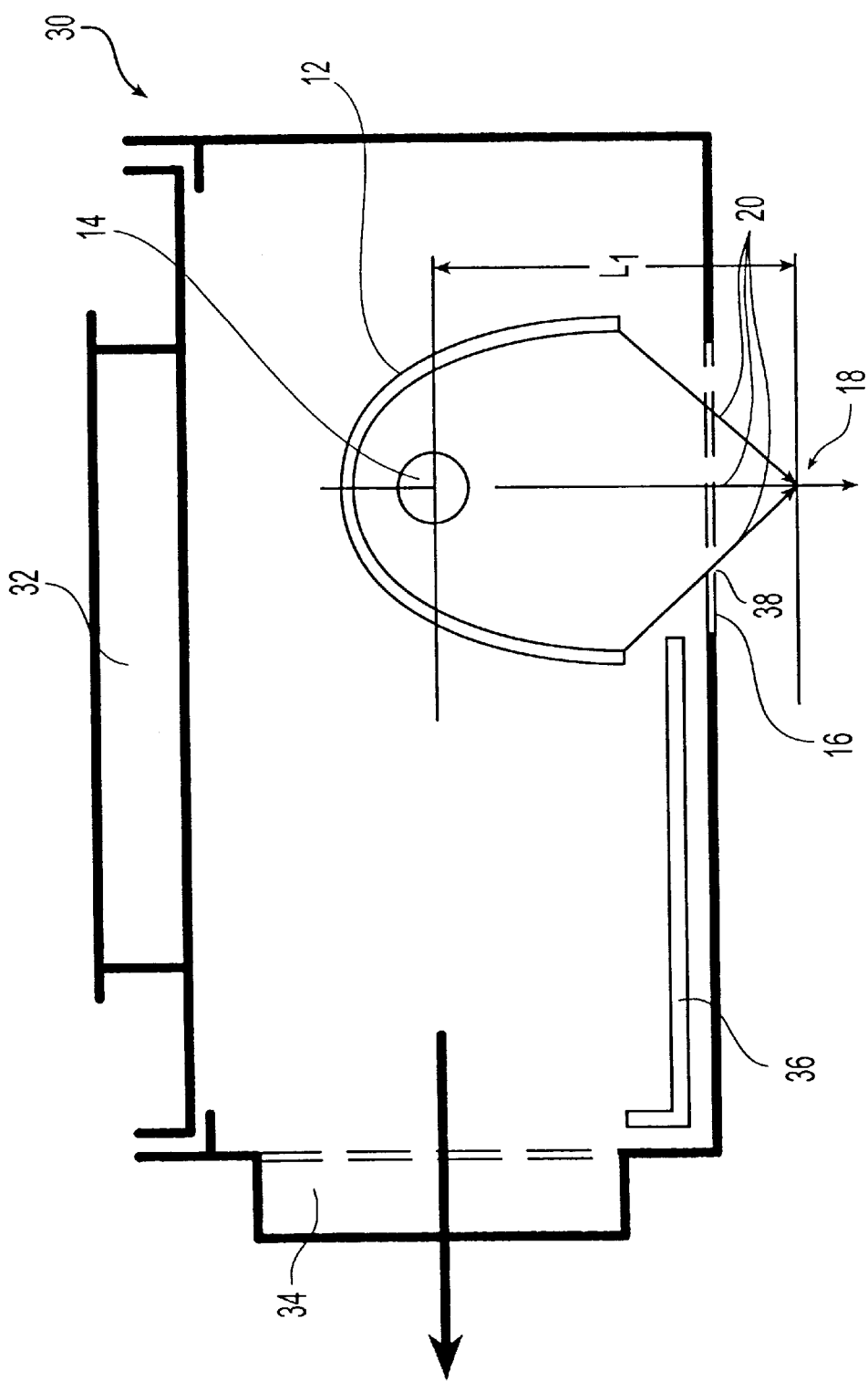
FIGS. 2, 3 and 4 are schematic cross-sectional drawings of other exemplary radiation sources wherein the power supply, though present, is not shown.
Figure 3:
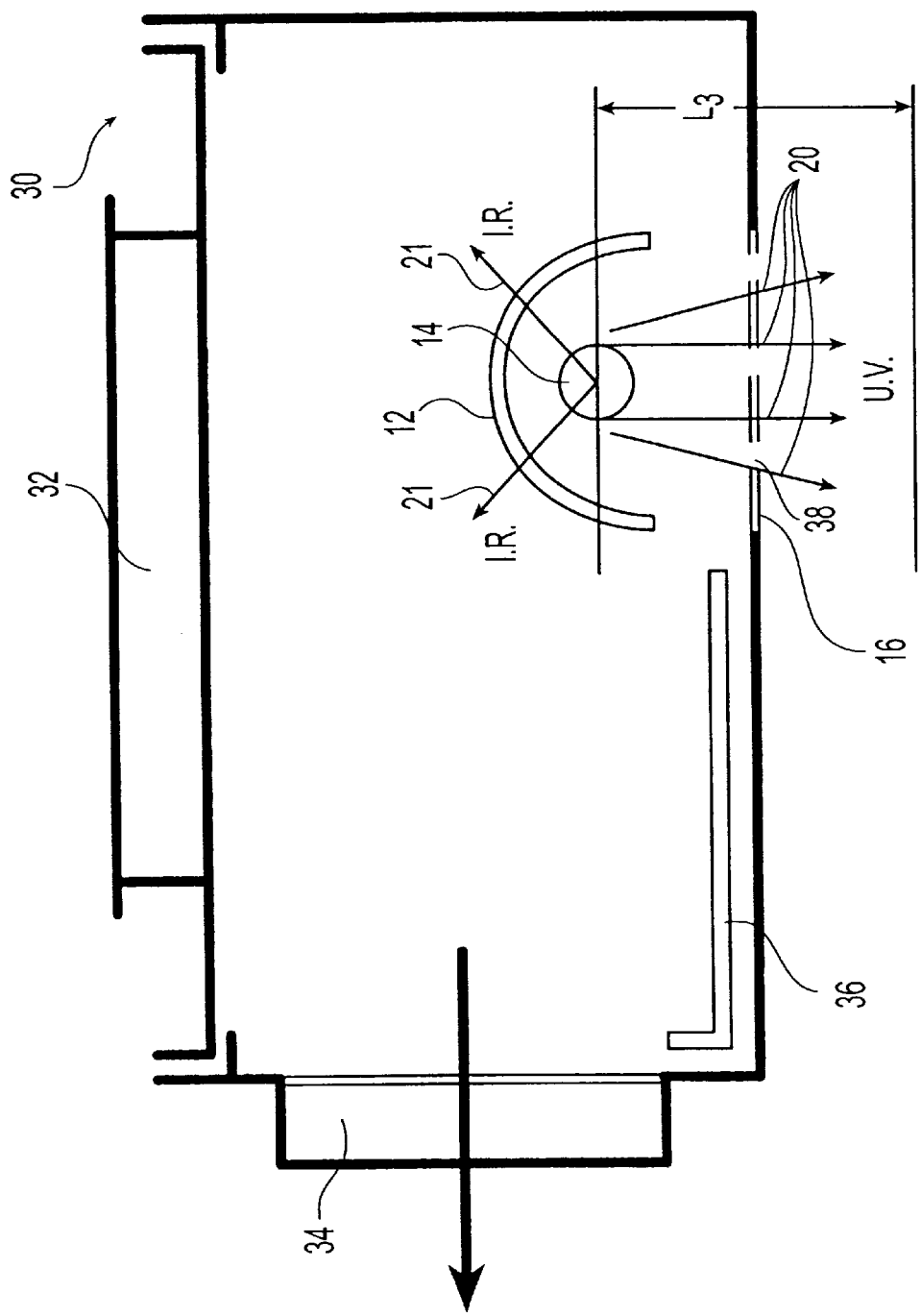
Figure 4:
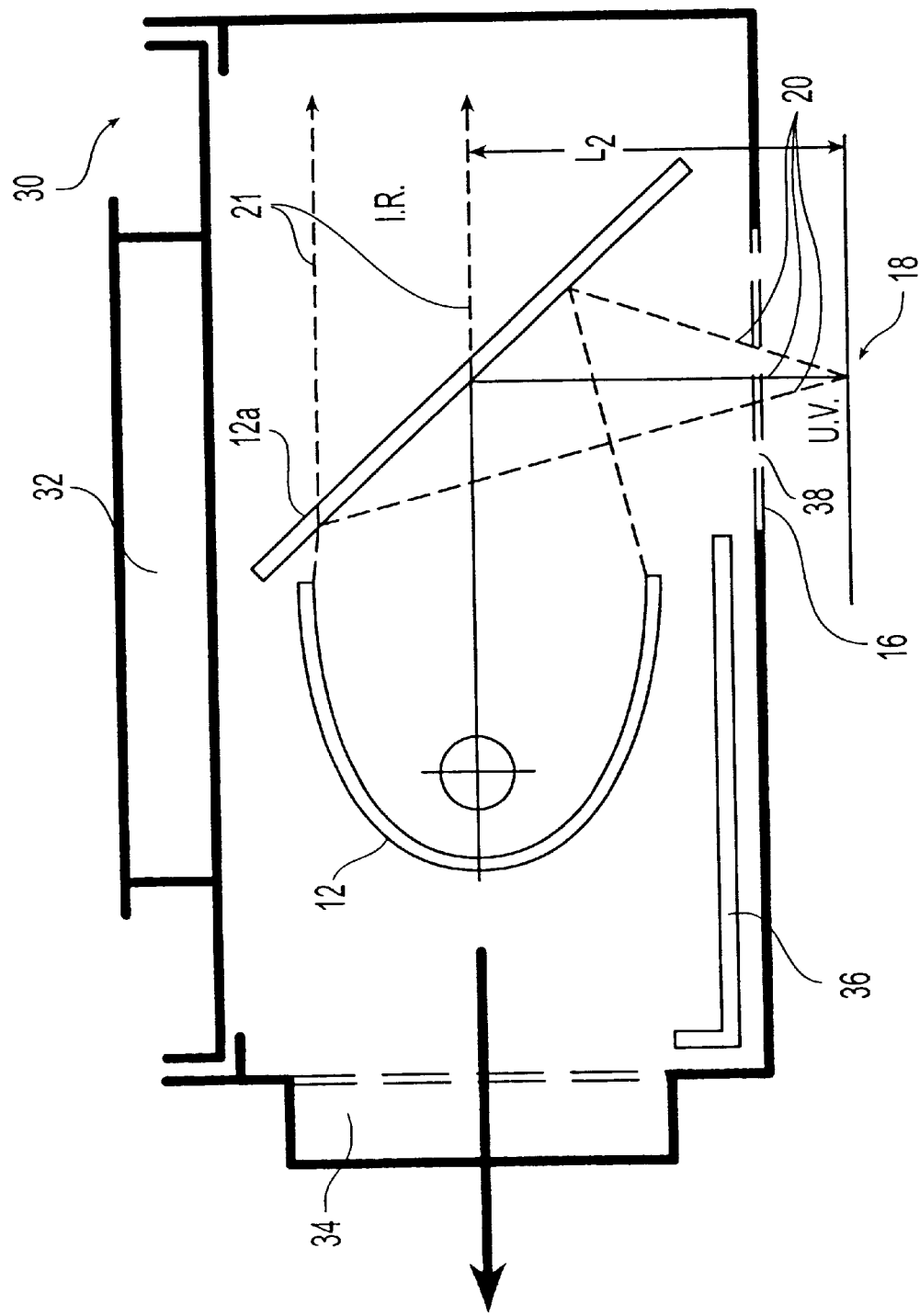

Other examples of radiation, e.g. UV and visible light sources are depicted in FIGS. 2, 3 and 4. With reference to FIG. 2, a chamber 30 is shown containing a reflector 12 (e.g., of elliptical shape), a bulb 14, an optional cooling fan 32, an optional air exhaust outlet 34, an optional shutter 36 and an opening 38 fitted with an optional screen 16 (e.g., microwave screen, etc.). Though not shown in FIGS. 2, 3 and 4, a power supply is provided. The elliptical reflector 12 may be made of a metal such as aluminum, a suitable alloy or a dichroic reflector. The dichroic reflector (e.g., quartz dichroic reflector) is preferred to a metallic reflector because it does not reflect infrared (IR) radiation and, thus, reduces the amount of heat reflected towards a given target 18 (e.g., located at a focal distance $L_1$).

With reference to FIG. 3, the radiation or UV and visible light source is the same as that depicted in FIG. 2, except that a semi-cylindrical reflector 12 (e.g., parabolic) is shown instead of the elliptical reflector 12 of FIG. 2. As an example, the reflector 12 of FIG. 3 is a dichroic quartz reflector which produces dispersed light output for broad flood exposure. In addition, the dichroic reflector 12 allows the majority of IR radiation 21 to pass through it without reflection. This, along with optional cooling fan 32 and optional air exhaust outlet 34, minimizes the heat directed from bulb 14 through opening 38 fitted with an optional screen 16. The heat dissipated out of opening 38 may be reduced by as much as about 50% by using a dichroic reflector instead of a metallic reflector. The object to be irradiated is preferably located at a distance $L_3$ from bulb 14. Typically, $L_3$ is about 5 inches or less, preferably, from about 3 inches to about 5 inches.

FIG. 4 is the same as FIG. 2 except that a second reflector 12a is provided as shown. When an elliptical reflector 12 is combined with a dichroic second reflector 12a (e.g., as depicted in FIG. 4), the UV and visible light source produces a high peak cure zone with about 97% UV efficiency. Further, IR radiation 21 directed through opening 38 is reduced by about 95% for temperature critical applications. The object to be irradiated is preferably located at a distance $L_2$ as depicted. Typically, $L_2$ is about 5 inches or less, preferably, from about 3 inches to about 5 inches.

As one of ordinary skill will appreciate, a focal length exists when the reflector 12 is of an elliptical or circular shape. However, when the reflector 12 has a parabolic shape, the emitted radiation 20 is reflected as parallel radiation waves (i.e., that do not intersect at a focal point). The ink layers to be cured are placed in the path of the radiation 20 emitted from bulb 14. For UV/vis curing, an elliptical reflector is preferred because the radiation is concentrated at the focal point. However, a parabolic reflector may be used. Though not shown in FIG. 1, the game ball surface to be irradiated (e.g., golf ball) is preferably positioned at a distance $L_1$ from bulb 14 to expose the inked layers to UV/visible curing radiation 20 at the focal point 18. Alternately, however, the ink layers (e.g., logo ink layers or production ink layers) may be located beyond bulb 14 and beyond optional microwave screen 16 at a distance from about ⅓ to about 10 times the focal length of an elliptical or circular reflector 12. The ink layers are then cured by exposing the ink layers to ultraviolet/visible radiation 20 from bulb 14.

For production inks, the distance $L_1$ from the bulb 14 to the ink layer is about 5 inches or less, typically, from about 3 inches to about 5 inches and, preferably, from about 3.5 inches to about 4 inches. For sufficient cure, an elliptical or a parabolic reflector (i.e., reflective to the radiation) such as a dichroic coated quartz reflector may be used. The ink is exposed to a dose of the UV and visible light sufficient to cure the production ink layers. The UV/vis dosage is, typically, in the range from about 0.4 joules/cm$^2$ to about 10 joules/cm$^2$ and, preferably, from about 1 to about 4.00 joules/cm$^2$. The input power of the radiation source should be sufficient to provide a dose sufficient to cure the ink layers without overheating (e.g., above about 120° F.) or otherwise detrimentally effecting the game ball, golf ball or the like.

Production ink layers typically have a thickness of from about 0.3 to about 25 microns. When exposed to curing radiation, the ink layers must be cured through the full thickness of the ink layers. Typically, the ink layer to be cured is exposed to curing radiation for a residence time (i.e., exposure time to the curing radiation) from about 0.25 to about 2.0 seconds, preferably, from about 1 second to about 1.5 seconds. As would be understood by one skilled in the art, if thicker ink layers (e.g., thicker than about 25 microns) are to be cured, then the residence time may need to be increased, the level of photoinitiator may need to be increased, the level of colorant may need to be decreased or some combination thereof.

For logo inks, the distance $L_1$ from the bulb 14 to the ink layer to be cured is about 5 inches or less, typically, from about 3 inches to about 5 inches and, preferably, from about 3.5 inches to about 4 inches at about the focal length. For sufficient cure of logo inks, an elliptical reflector (e.g. polished aluminum reflector that is reflective to radiation) is preferred. As with production inks, the logo ink is exposed to a dose of the radiation sufficient to cure the logo ink layer. The dosage is, typically, in the range from about 0.4 joules/cm$^2$ to about 10 joules/cm$^2$ and, preferably, from about 1 joule/cm$^2$ to about 4 joules/cm$^2$. The input power of the irradiating source, the residence time and the ink layer thickness compatible for curing logo inks are the same as those that are compatible for curing production inks described previously.

Ultraviolet radiation sources are well known to those skilled in the art. See, for example, U.S. Pat. No.: 4,501,993 (Mueller et al.), U.S. Pat. No. 4,887,008 (Wood), U.S. Pat. No. 4,859,906 (Ury et al.); U.S. Pat. No. 4,485,332 (Ury et al.), U.S. Pat. No. 4,313,969 (Matthews et al.), U.S. Pat. No. 5,300,331 (Schaeffer), U.S. Pat. No. 3,872,349 (Spero et al.), U.S. Pat. No. 4,042,850 (Ury et al.), U.S. Pat. No. 4,507,587 (Wood et al.), U.S. Pat. No. 5,440,137 (Sowers), U.S. Pat. No. 3,983,039 (Eastlund) and U.S. Pat. No. 4,208,587 (Eastlund et al.), each incorporated herein by reference in its entirety. Commercially available UV radiation sources include, but are not limited to, Fusion Model 300 from Fusion Systems Corp. of Rockville, Md., Hönle Model UVA Print 740 (e.g., fitted with a Mercury bulb, a metal halide bulb or another bulb having an output wavelength from about 200 nm to about 450 nm) from Hbnle Corp. of Marlboro, Mass. and UVEXS models designated as UVEXS Model CCU, UVEXS Model ECU, UVEXS Model SAC, UVEXS Model SACC, UVEXS Model OCU, UVEXS SCU and UVEXS Model 471, available from Ultraviolet Exposure Systems, Inc. of Sunnyvale, Calif.

Having described the invention, the following examples are provided to illustrate specific applications thereof, including the best mode now known to perform the invention. These specific examples are not intended to limit the scope of the invention described herein.

EXAMPLES

Several inks, designated as "A", "B", "C", "D" and "E" (see Tables I and II, infra), were production printed or logo printed on SURLYN® covered golf balls. Inks "A", "B" and "C" refer to production inks while inks "D" and "E" refer to logo inks.

The production inks were pad printed onto roughened SURLYN® golf ball covers to form production prints. After pad printing with inks A, B and C, each of the balls was flashed at ambient temperature for about 10 to 30 minutes to evaporate any solvents present. Thereafter, the inks were UV radiation cured with a Fusion Model 300 UV source using a "D bulb" having a peak power at about 370 nanometers. The "D bulb" is provided by Fusion Systems Corp. While the "D bulb" is preferred, Fusion Systems' "H bulb" or the "V bulb" may be used or a combination thereof. Each of these bulbs is a mercury UV irradiating bulb. The residence time for curing was from about 1 second to about 1.25 seconds and the distance from the bulb to the production ink layer was about 4 inches. During UV curing of the production inks, air was fed over the golf ball to keep the ball and ink surfaces cool. After curing, the production ink layers were coated with an overcoat of a water based urethane (e.g., PPG S-24455). Then, the overcoat was topcoated with a 2 part urethane topcoat (e.g., PPG S-24853).

With reference to inks D and E, the logo inks were pad printed onto a topcoat layer (PPG S-24853) deposited over a water based urethane (PPG S-24455) on a SURLYN® cover golf ball. Thereafter, the ink layers were flashed at ambient temperature from about 10 to about 30 minutes to evaporate any solvents therein (i.e., in the logo inks "D" and "E"). The logo inks were then UV cured with a Fusion Systems Model 300 UV source under the same conditions used with respect to the production ink layers previously described.

These pad printed balls (i.e. production printed and logo printed) were then tested as indicated below. The test results are provided in Table III, infra.

For a production ink or a logo ink to have sufficient adhesion (e.g., for production ink—intercoat adhesion to a golf ball cover or primer coat and adhesion to a topcoat or overcoat after UV radiation curing; for logo ink—adhesion to topcoat after UV radiation curing) in accordance with the present invention, the production ink or logo ink should exhibit adhesion to at least about 75% of the inked surface.

Adhesion of production inks and logo inks is measured by several methods. A first method involves abrasion testing wherein production or logo inked golf balls are tumbled for about three hours (to determine the effect on adhesion) as indicated below.

Tumble Test (Adhesion Test) on Coating Durability

A tumble test was designed to gauge abrasion/scuff resistance to duplicate the wear and abrasion characteristics of range golf balls. The test utilizes E252 Alundum (granule size SM8) and small marble chips as the tumble media.

Operating Procedure

Step 1. Using a cast aluminum scoop, place 2 level scoops of E252 Alundum (granule size SM8) and 2 level scoops of small marble chips into a ball mill.

Note: 1 scoop of Alundum weighs about 1.78 pounds. 1 scoop of small marble chips weighs about 1.71 pounds.

Step 2. Place total of 24 balls (test balls and control balls, if any) into the ball mill.

Note: It is recommended that each group consists of 6 balls.

Step 3. Add two more level scoops of Alundum and marble chips into the ball mill (over the balls).

Step 4. Lock the ball mill lid.

Step 5. Position the ball mill sideways on a rotation device (e.g., manufactured by Norton).

Step 6. Turn the rotation device power "ON".

Step 7. Tumble the balls continuously for 3 hours at about 60 revolutions per minute (i.e., of the rotation device).

Step 8. At the end of 3 hours, turn the rotation device off.

Step 9. Remove the ball mill from the rotation device. Place the ball mill right side up (i.e., upright) on the floor.

Step 10. Unlock the ball mill lid.

Step 11. Pick out the 24 balls from the ball mill.

Step 12. Using a Nessler tube brush, rinse and brush the balls under a water faucet. Add soap and scrub with a brush.

Step 13. Dry the balls with towels. Divide them into their respective groups.

Step 14. Visually examine the ink durability of the test balls.

A second test involves subjecting UV cured production inked and logo inked golf balls to a number (e.g., 100, 200, 500 etc.) of random collisions with a non-elastic surface (e.g., a grooved steel plate) at a high speed (e.g., about 90 miles per hour). Preferably, the speed of the non-elastic surface is at least about 90 miles per hour upon impact with the ball.

A third test involves conducting a tape adhesion test such as ASTM test D-3359-87 (Method B) as applied to UV cured production ink and UV cured logo ink images, for example, on a golf ball. After each test, the inked golf balls were visually inspected to determine the integrity of the inked image tested. Table I below indicates the production ink compositions tested. Table II below indicates the logo ink compositions tested. The results of these tests are indicated in Table III below.

TABLE I

Production Ink Composition

| | Unmodified Production Ink A | Unmodified Production Ink B | Modified Production Ink C |
|---|---|---|---|
| Ink Base Composition | Gotham Ink ® (Black Ink Formula 43770; Product Code 9241), a nitrocellulose based stock ink containing carbon black | Trans-tech UVA ® Carbon Black Ink with 65% by weight solids containing stock carbon black and stock photoinitiator | Trans-tech UVA ® Carbon Black Ink with 65% by weight solids containing stock carbon black and stock photoinitiator |
| Adhesion Promoting Component | — | — | SB0520E35 - 10% by weight |
| Flexibility Promoting Component | — | — | CN-966H90 - 20% by weight |
| Photoinitiator | — | Stock photoinitiator as provided in Stock Trans-tech UVA ® Carbon Black Ink with 65% solids | Stock photoinitiator as provided in Trans-tech UVA ® Carbon Black Ink with 65% solids plus KIP-100 F. - 0.1% by weight |
| Colorant | Stock Carbon Black as provided in Gotham Ink ® Formula 43770 | Stock Carbon Black as provided in Trans-tech UVA ® Carbon Black Ink with 65% solids | Stock Carbon Black as provided in Trans-tech UVA ® Carbon Black Ink with 65% solids |
| Solvent | Stock solvent as provided in Gotham Ink ® Formula 43770 | Stock solvent as provided in Trans-tech UVA ® Carbon Black Ink with 65% solids | Ethyl-3-ethoxy propionate - 5% by weight |

TABLE II

Logo Ink Composition

| | Unmodified Logo Ink D | Modified Logo Ink E | Modified Logo Ink F | Unmodified Logo Ink G |
|---|---|---|---|---|
| Ink Base Composition | Marabu ™ - Two Pack Urethane (TPU) Series Black Ink | Trans-tech UVA Carbon Black Ink with 65% solids containing stock Carbon Black and stock photoinitiator | Trans-tech UVA Carbon Black Ink with 65% solids containing stock Carbon Black and stock photoinitiator | Trans-tech UVA Carbon Black Ink with 65% solids containing stock Carbon Black and stock photoinitiator |
| Toughening Agent | — | SR-506 - 20% by weight | SR-506 - 20% by weight | — |
| Sip & Mar Agent | — | BYK-371 - 2% by weight | — | — |
| Photoinitiator | — | Stock photoinitiator as provided in Stock Trans-tech UVA Carbon Black Ink with 65% solids | Stock photoinitiator as provided in Stock Trans-tech UVA Carbon Black Ink with 65% solids | Stock photoinitiator as provided in Stock Trans-tech UVA Carbon Black Ink with 65% solids |
| Colorant | Stock Carbon Black as provided in Marabu ™ - TPU Series Black Ink | Stock Carbon Black as provided in Trans-tech UVA Carbon Black Ink with 65% solids | Stock Carbon Black as provided in Trans-tech UVA Carbon Black Ink with 65% solids | Stock Carbon Black as provided in Trans-tech UVA Carbon Black Ink with 65% solids |
| Solvent | Stock solvent as provided in Marabu ™ - TPU Series Black Ink | Ethyl-3-ethoxy propionate - 13% by weight | Ethyl-3-ethoxy propionate - 13% by weight | Ethyl-3-ethoxy propionate - 13% by weight |

TABLE III

Test Results of Ink Images

| | Unmodified Production Ink A | Unmodified Production Ink B | Modified Production Ink C | Unmodified Logo Ink D | Modified Logo Ink E | Modified Logo Ink F | Unmodified Logo Ink G |
|---|---|---|---|---|---|---|---|
| Tape Adhesion Test[1,2] | 0B | — | 5B | 5B | 5B | 5B | 5B |
| Tumble Test[2] | 1 | — | 9 | 3 | 9 | 6 | 6 |
| 200 Hit Test[3,2] | 1 | 1 | 10 | 3 | 10 | 8 | 5 |
| 500 Hit Test[4] | — | — | — | — | — | — | — |
| % of Inked Surface Image Integrity Loss by 200 Hit Test | 85–90% | 95% (note topcoat adhesion loss) | 0% | 50% | 5% | 10% | 20% |

TABLE III-continued

Test Results of Ink Images

|  | Unmodified Production Ink A | Unmodified Production Ink B | Modified Production Ink C | Unmodified Logo Ink D | Modified Logo Ink E | Modified Logo Ink F | Unmodified Logo Ink G |
|---|---|---|---|---|---|---|---|
| Cover Polymer | Surlyn ™ | Surlyn ™ | Surlyn ™ | Surlyn ™ | Surlyn ™ | Surlyn ™ | Surlyn ™ |
| Undercoat Composition | Water based urethane (PPG S-24455 from Pittsburgh Plate & Glass Co.) | Water based urethane (PPG S-24455 from Pittsburgh Plate & Glass Co.) | Water based urethane (PPG S-24455 from Pittsburgh Plate & Glass Co.) | Water based urethane (PPG S-24455 from Pittsburgh Plate & Glass Co.) | Water based urethane (PPG S-24455 from Pittsburgh Plate & Glass Co.) | Water based urethane (PPG S-24455 from Pittsburgh Plate & Glass Co.) | Water based urethane (PPG S-24455 from Pittsburgh Plate & Glass Co.) |
| Top Coat Composition | PPG S-24853 | PPG S-24853 | PPG S-24853 | PPG S-24853 | PPG S-24853 | PPG S-24853 | PPG S-24853 |

[1]ASTM D3359-87 (Method B); 0B = >65% degradation, 1B = 50% degradation, 2B = 40% degradation, 3B = 30% degradation, 4B = 10% degradation, 5B = 0% degradation
[2]Test results are indicated on a numerical scale of 1–10 wherein
1 = severe image degradation
3 = nearly severe image degradation
5 = moderate image degradation
7 = nearly moderate image degradation
9 = minimal image degradation
10 = no visible image degradation
[3]Production ink balls were randomly hit with a hitting machine having an arm which rotates at about 90 miles per hour--200 times.
[4]Production ink balls were randomly hit with a hitting machine having an arm which rotates at 90 miles per hour--500 times.

As indicated in Table III, both modified production ink C and modified logo ink E showed no image degradation from the Tape Adhesion Test. Likewise, the tumble test left the production and logo prints (i.e., modified inks C and E, respectively) on the golf balls with minimal image degradation. Further, with the 200 Hit Test, the production prints and logo prints of modified inks C and E, respectively, exhibited minimal image degradation. As a result of the 200 Hit Test, less than 10% of the logo print image (i.e., modified ink E) integrity was lost while no loss of production print image (i.e., modified ink C) integrity was observed. The test results for the unmodified inks A, B and D were not nearly as good as is apparent from Table III.

To evaluate the benefits of using visible light photoinitiators in radiation curable inks, inks according to the following formulations were prepared:

| Formulation 1 | Formulation 2 |
|---|---|
| 100 parts Trans Tech UVA green ink | 100 parts Trans Tech UVA green ink |
| 20 parts isobornyl acrylate | 20 parts isobornyl acrylate |
| 2 parts BYK 371 | 2 parts BYK 371 |
| 1 part DIDMA | 1 part DIDMIA |
|  | 0.05 parts HNU 470 visible light photoinitiator |

As shown above, aside from the inclusion of the visible light photoinitiator in ink Formulation 2, both inks contain the same ingredients, at the same quantities.

Formulations 1 and 2 were each pad printed on six dozen balls. One dozen of each formulation was cured at a production line speed of 15, 17, 19, 21, 23 and 25 ft/min on a Honle curing unit using a UV/visible light emitting bulb.

Figure 5:
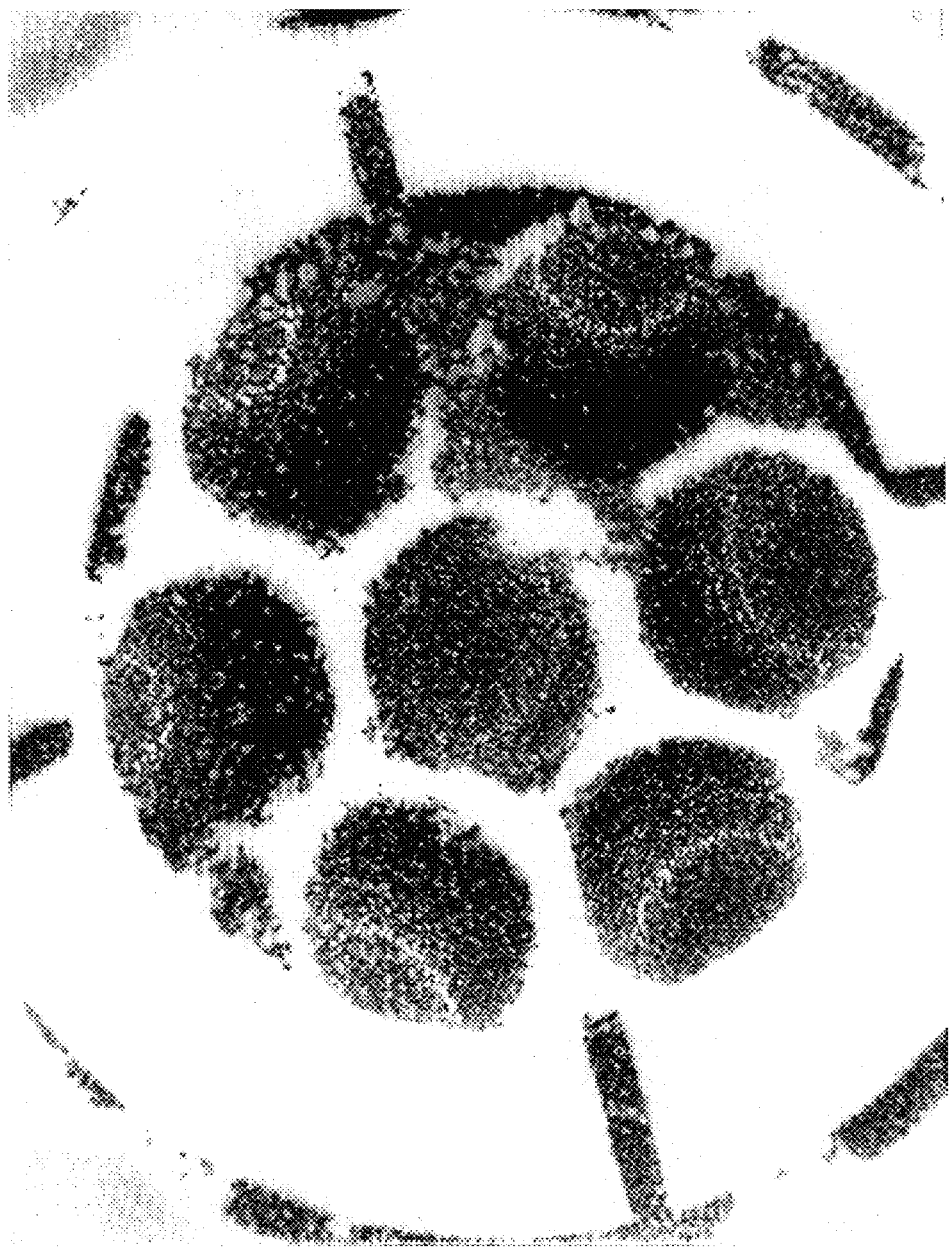
FIGS. 5 and 6 show the average ink loss due to hit testing for an ink containing no visible light photoinitiators and an ink containing a visible light photoinitiator, respectively.
Figure 6:
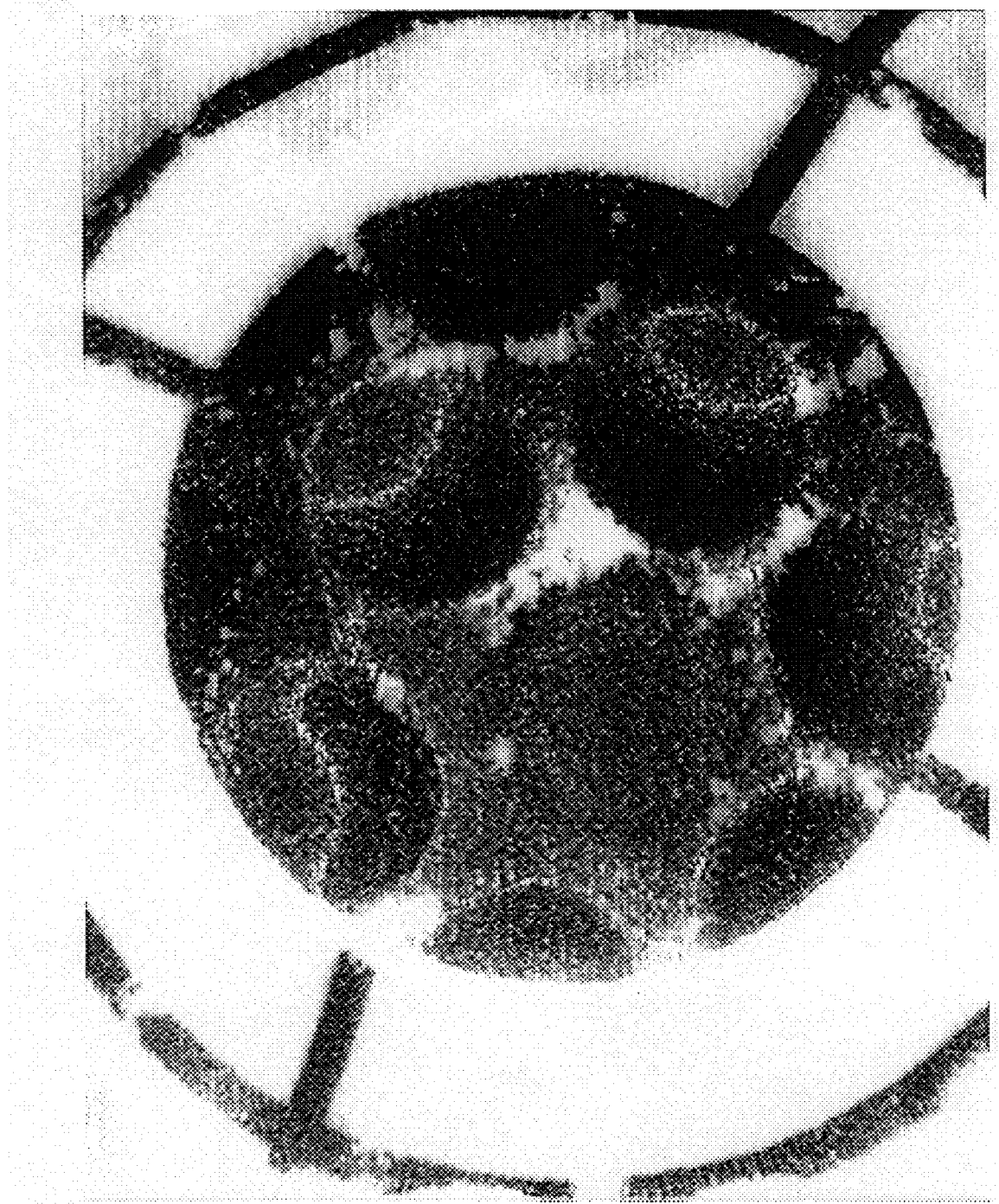

After the test balls were hit tested 200 times, it was found that the adhesion of the Formulation 2 ink to the substrate out performed that of the Formulation 1 ink when the line speed was equal to or greater than 19 ft/min, FIG. 5 shows that the Formulation 1 ink exhibited an average 80– 90% ink loss on the frets of the dimples due to the hit testing. The dosage of curing radiation at a line speed of 19 ft/min was 1.73 Joule/cm with a lamp output of 1.43 watts/cm$^2$. In contrast, as shown in FIG. 6, the Formulation 2 inks only exhibited an average 10–20% ink loss on the frets of the dimples as a result of the hit testing. Since the amount of ink loss is directly related to the degree of through-cure of the ink, the Formulation 2 ink achieved better curing compared to the Formulation 1 ink. At line speeds less than 19 ft/min both ink formulations exhibited little ink loss.

These results demonstrate that the inclusion of a visible light photoinitiator in a radiation curable ink permits more efficient curing. Specifically, the use of the visible light photoinitiator enabled the Formulation 2 ink to achieve better through-curing (as shown by the improved adhesion) at relatively faster line speeds.

What is claimed is:

1. A radiation curable water-insoluble production ink for forming an inked surface on at least a portion of a surface of a ball, at least said inked surface thereafter being coated with a topcoat, said ink comprising:
    (a) a prepolymer having at least two prepolymer functional moieties, said prepolymer being selected from the group consisting of a first acrylate, an ester and mixtures thereof;
    (b) a polymerizable monomer;
    (c) a visible light photoinitiator, wherein the visible light photoinitiator has an absorbance spectrum in both the ultraviolet and visible light regions;
    (d) an adhesion promoting component having at least one adhesion promoting functional moiety, said component being sufficient to maintain adhesion of at least about 75% of said inked surface to said topcoat and to said ball surface upon curing of said ink and after coating said ink with said topcoat; and
    (e) an ultraviolet light photoinitiator.

2. The production ink of claim 1 wherein a substantial portion of an absorbance spectrum of said visible light photoinitiator is at wavelengths greater than about 400 nm.

3. The production ink of claim 1 wherein the visible light photoinitiator has a maximum absorbance at wavelengths greater than about 400 nm.

4. The production ink of claim 1 wherein the visible light photoinitiator is selected from the group consisting of fluorene derivatives, titanocenes, ketocoumarines, acridine dyes, xanthene dyes, azine dyes, thiazine dyes, polymethine dyes and mixtures thereof.

5. The production ink of claim 4 wherein the visible light photoinitiator is selected from the group consisting of 5,7-diiodo-3-butoxy-6-fluorene; 2,4,5,7-tetraiodo-3-hydroxy-6-fluorene; 2,4,5,7-tetraiodo-9-cyano-3-hydroxy-6-fluorene; and mixtures thereof.

6. The production ink of claim 1 wherein the visible light photoinitiator is present in an amount of about 0.01 to about 3 parts per 100 parts ink.

7. The production ink of claim 6 wherein the visible light photoinitiator is present in an amount of about 0.02 to about 0.1 parts per 100 parts of ink.

8. The production ink of claim 7 wherein the visible light photoinitiator is present in an amount of about 0.05 to about 0.07 parts per 100 parts of ink.

9. The production ink of claim 8 further comprising an ultraviolet light photoinitiator, wherein the ultraviolet light photoinitiator is present in the amount of about 0.05% to about 15% by weight of the ink.

10. The production ink of claim 7 further comprising an ultraviolet light photoinitiator, wherein the ultraviolet light photoinitiator is present in the amount of about 0.05% to about 15% by weight of the ink.

11. The production ink of claim 1 wherein the ink further comprises a co-initiator.

12. The production ink of claim 11 wherein the co-initiator is selected from the group consisting of iodonium salts, sulfonium salts, pyrylium salts, thiapyrylium salts, diazonium salts, ferrocenium salts, aromatic amines, triarylalkyl borate ammonium salts; and mixtures thereof.

13. The production ink of claim 11 wherein the visible light photoinitiator and the co-initiator are present in a ratio of about 1:5 to about 1:30.

14. The production ink of claim 13 wherein the visible light photoinitiator and the co-initiator are present in a ratio of about 1:10 to about 1:25.

15. The production ink of claim 14 wherein the visible light photoinitiator and the co-initiator are present in a ratio of about 1:20 to about 1:25.

16. The production ink of claim 1 wherein said adhesion promoting component is selected from the group consisting of a carboxylic acid functional monomer, a carboxylic acid functional oligomer, an ester functional monomer, an ester functional oligomer and mixtures thereof.

17. The production ink of claim 1 wherein said ink further comprises a viscosity reducing component having a molecular weight from about 100 grams per mole to about 1000 grams per mole and is selected from the group consisting of acrylate monomers, acrylate oligomers and mixtures thereof.

18. The production ink of claim 17 wherein said viscosity reducing component is present in an amount from about 10 to about 50 percent by weight of the total weight of said adhesion promoting component.

19. The production ink of claim 1 wherein said ink further comprises a flexibility promoting component having a post cure elastic modulus in an amount from about 200 to about 60,000 pounds per square inch and a post cure elongation in an amount from about 5 to about 350%.

20. The production ink of claim 19 wherein said flexibility promoting component is selected from the group consisting of a second acrylate, a ring opening heterocycle and mixtures thereof and wherein said ring opening heterocycle is selected from the group consisting of cyclic ethers, cyclic lactones, cyclic sulphides, cyclic acetals, cyclic siloxanes and mixtures thereof.

21. The production ink of claim 20 wherein said second acrylate is selected from the group consisting of aliphatic acrylates, aromatic acrylates and mixtures thereof.

22. A radiation curable water-insoluble production ink for forming an inked surface on at least a portion of a surface of a ball, at least said inked surface thereafter being coated with a topcoat, said ink comprising:
(a) a prepolymer having at least two prepolymer functional moieties, said prepolymer being selected from the group consisting of a first acrylate, an ester and mixtures thereof;
(b) a polymerizable monomer;
(c) a visible light photoinitiator having an absorbance spectrum in both the ultraviolet and visible light regions and wherein a substantial portion of the absorbance spectrum is at wavelengths greater then about 400 nm;
(d) a co-initiator;
(e) an adhesion promoting component having at least one adhesion promoting functional moiety, said component being sufficient to maintain adhesion of at least about 75% of said inked surface to said topcoat and to said ball surface upon curing of said ink and after coating said ink with said topcoat; and
(f) an ultraviolet light photoinitiator.

23. A radiation curable water-insoluble logo ink for forming an inked surface on at least a portion of a topcoated surface of a ball, said ink comprising:
(a) a prepolymer having at least two prepolymer functional moieties, said prepolymer being selected from the group consisting of a first acrylate, an ester and mixtures thereof;
(b) a polymerizable monomer;
(c) a visible light photoinitiator; and
(d) a toughening agent, said toughening agent being sufficient to cause adhesion of said ink to said topcoat of at least about 75% of said inked surface after curing.

24. The logo ink of claim 23 wherein the visible light photoinitiator has an absorbance spectrum in both the ultraviolet and visible light regions.

25. The logo ink of claim 23 wherein the visible light photoinitiator has an absorbance spectrum only in the visible light region.

26. The logo ink of claim 23 wherein a substantial portion of an absorbance spectrum of said visible light photoinitiator is at wavelengths greater than about 400 nm.

27. The logo ink of claim 23 wherein the visible light photoinitiator has a maximum absorbance at wavelengths greater than about 400 nm.

28. The logo ink of claim 23 wherein the visible light photoinitiator is selected from the group consisting of fluorene derivatives, titanocenes, ketocoumarines, acridine dyes, xanthene dyes, azine dyes, thiazine dyes, polymethine dyes and mixtures thereof.

29. The logo ink of claim 28 wherein the visible light photoinitiator is selected from the group consisting of 5,7-diiodo-3-butoxy-6-fluorene; 2,4,5,7-tetraiodo-3-hydroxy-6-fluorene; 2,4,5,7-tetraiodo-9-cyano-3-hydroxy-6-fluorene; and mixtures thereof.

30. The logo ink of claim 23 wherein the visible light photoinitiator is present in the amount of about 0.01 parts to about 3 parts per 100 parts of ink.

31. The logo ink of claim 30 wherein the visible light photoinitiator is present in the amount of about 0.02 to about 0.1 parts per 100 parts of ink.

32. The logo ink of claim 31 wherein the visible light photoinitiator is present in an amount of about 0.05 to about 0.07 parts per 100 parts of ink.

33. The logo ink of claim 32 further comprising an ultraviolet light photoinitiator, wherein the ultraviolet light photoinitiator is present in the amount of about 0.05% to about 15% by weight of the ink.

34. The logo ink of claim 31 further comprising an ultraviolet light photoinitiator, wherein the ultraviolet light photoinitiator is present in the amount of about 0.05% to about 15% by weight of the ink.

35. The logo ink of claim 23 wherein the ink further comprises a co-initiator.

36. The logo ink of claim 35 wherein the co-initiator is selected from the group consisting of iodonium salts, sulfonium salts, pyrylium salts, thiapyrylium salts, diazonium salts, ferrocenium salts, aromatic amines, triarlalkyl borate ammonium salts; and mixtures thereof.

37. The logo ink of claim 35 wherein the visible light photoinitiator and the co-initiator are present in a ratio of about 1:5 to about 1:30.

38. The logo ink of claim 37 wherein the visible light photoinitiator and the co-initiator are present in a ratio of about 1:10 to about 1:25.

39. The logo ink of claim 38 wherein the visible light photoinitiator and the co-initiator are present in a ratio of about 1:20 to about 1:25.

40. The logo ink of claim 23 wherein the ink further comprises an ultraviolet light photoinitiator.

41. The logo ink of claim 40 wherein the ultraviolet light photoinitiator is present in the amount of about 0.05% to about 15% by weight.

42. The logo ink of claim 23 wherein said toughening agent is selected from the group consisting of an epoxy acrylate, isobornyl acrylate, tetrahydrofurfuryl acrylate, dicyclopentenyl oxyethyl acrylate, vinyl toluene, isobornyl methacrylate, tetrahydrofurfuryl methacrylate, cyclohexyl methacrylate, dicyclopentenyl methacrylate, dicyclopentenyl oxyethyl methacrylate and mixtures thereof, wherein said adhesion is maintained after said ball having said cured inked surface is subjected to at least about 100 random collisions with a non-elastic surface at least at about 90 miles per hour.

43. The logo ink of claim 23 wherein said toughening agent is present in an amount from about 5–75% by weight of said ink.

44. The logo ink of claim 23 further comprising a friction reducing agent.

45. The logo ink of claim 44 wherein said friction reducing agent is selected from the group consisting of a dimethylpolysiloxane, a silicon acrylate and mixtures thereof.

46. The logo ink of claim 44 wherein said friction reducing agent is present in an amount from about 0.1–10% by weight of said ink.

47. The logo ink of claim 23 wherein said toughening agent is selected from the group consisting of an epoxy acrylate, isobornyl acrylate, tetrahydrofurfuryl acrylate, dicyclopentenyl oxyethyl acrylate, vinyl toluene, isobornyl methacrylate, tetrahydrofurfuryl methacrylate, cyclohexyl methacrylate, dicyclopentenyl methacrylate, dicyclopentenyl oxyethyl methacrylate, and mixtures thereof.

48. A radiation curable water-insoluble logo ink for forming an inked surface on at least a portion of a topcoated surface of a ball, said ink comprising:

(a) a prepolymer having at least two prepolymer functional moieties, said prepolymer being selected from the group consisting of a first acrylate, an ester and mixtures thereof;

(b) a polymerizable monomer;

(c) a visible light photoinitiator having an absorbance spectrum in both the ultraviolet and visible light regions and wherein a substantial portion of the absorbance spectrum is at wavelengths greater then about 400 nm;

(d) a co-initiator; and (e) an toughening agent, said toughening agent being sufficient to cause adhesion of said ink to said topcoat of at least about 75% of said inked surface after curing.

49. A radiation curable water-insoluble production ink for forming an inked surface on at least a portion of a surface of a ball, at least said inked surface thereafter being coated with a topcoat, said ink comprising:

(a) a prepolymer having at least two prepolymer functional moieties, said prepolymer being selected from the group consisting of a first acrylate, an ester and mixtures thereof;

(b) a polymerizable monomer;

(c) a visible light photoinitiator, wherein the visible light photoinitiator has an absorbance spectrum only in the visible light region;

(d) an adhesion promoting component having at least one adhesion promoting finctional moiety, said component being sufficient to maintain adhesion of at least about 75% of said inked surface to said topcoat and to said ball surface upon curing of said ink and after coating said ink with said topcoat; and (e) an ultraviolet light photoinitiator.

50. The production ink of claim 49 wherein the ultraviolet light photoinitiator is present in the amount of about 0.05% to about 15% by weight of the ink.

* * * * *

UNITED STATES PATENT AND TRADEMARK OFFICE
CERTIFICATE OF CORRECTION

PATENT NO. : 6,248,804 B1
DATED : June 19, 2001
INVENTOR(S) : Mitchell E. Lutz

It is certified that error appears in the above-identified patent and that said Letters Patent is hereby corrected as shown below:

Title page,
The title of the invention should be changed to -- ULTRAVIOLET AND/OR VISIBLE LIGHT CURABLE INKS WITH PHOTOINITIATORS FOR GAME BALLS, GOLF BALLS AND THE LIKE. --

Column 28, claim 48,
Line 24, the word "an" should be -- a --.

Column 28, claim 49,
Line 42, the word "finctional" should be -- functional --.

Signed and Sealed this

Twenty-sixth Day of March, 2002

*Attest:*

JAMES E. ROGAN
*Attesting Officer*     *Director of the United States Patent and Trademark Office*